(12) United States Patent
Raghavan et al.

(10) Patent No.: US 7,238,131 B2
(45) Date of Patent: Jul. 3, 2007

(54) ELECTRICALLY VARIABLE TRANSMISSION HAVING THREE PLANETARY GEAR SETS AND THREE FIXED INTERCONNECTIONS

(75) Inventors: Madhusudan Raghavan, West Bloomfield, MI (US); Norman K. Bucknor, Troy, MI (US); James D. Hendrickson, Belleville, MI (US)

(73) Assignee: General Motors Corporation, Detroit, MI (US)

( * ) Notice: Subject to any disclaimer, the term of this patent is extended or adjusted under 35 U.S.C. 154(b) by 208 days.

(21) Appl. No.: 11/028,820

(22) Filed: Jan. 4, 2005

(65) Prior Publication Data

US 2006/0148604 A1    Jul. 6, 2006

(51) Int. Cl.
*F16H 3/72* (2006.01)
(52) U.S. Cl. .......................................................... 475/5
(58) Field of Classification Search .................... 475/5, 475/275, 282
See application file for complete search history.

(56) References Cited

U.S. PATENT DOCUMENTS

| | | | |
|---|---|---|---|
| 5,558,595 A | 9/1996 | Schmidt et al. | 477/3 |
| 5,931,757 A | 8/1999 | Schmidt | 475/2 |
| 6,358,173 B1 * | 3/2002 | Klemen et al. | 475/5 |
| 6,478,705 B1 | 11/2002 | Holmes et al. | 475/5 |
| 6,527,658 B2 | 3/2003 | Holmes et al. | 475/5 |
| 6,551,208 B1 * | 4/2003 | Holmes et al. | 475/5 |
| 6,953,409 B2 * | 10/2005 | Schmidt et al. | 475/5 |
| 7,101,298 B2 * | 9/2006 | Sowul et al. | 475/5 |
| 2006/0025259 A1 * | 2/2006 | Klemen et al. | 475/5 |
| 2006/0063628 A1 * | 3/2006 | Sowul et al. | 475/5 |

\* cited by examiner

*Primary Examiner*—Ha Ho
(74) *Attorney, Agent, or Firm*—Kathryn A. Marra

(57) ABSTRACT

A family of electrically variable transmissions providing low-content, low-cost electrically variable transmission mechanisms including first, second and third differential gear sets, a battery, two electric machines serving interchangeably as motors or generators, and three selectable torque-transfer devices (two clutches and one brake. The three selectable torque transfer devices are engaged singly, in combinations of two, or singly along with a selectively braked motor/generator to yield an EVT with a continuously variable range of speeds (including reverse) and four mechanically fixed forward speed ratios. Alternatively, the three torque transfer devices may be disengaged while both motor/generators are braked to provide a fixed speed ratio. The first, second and third torque transfer devices and the first and second motor/generators are operable to provide five operating modes in the electrically variable transmission, including battery reverse mode, EVT reverse mode, reverse and forward launch modes, continuously variable transmission range mode, and fixed ratio mode.

16 Claims, 15 Drawing Sheets

| | RATIOS | 50 | 52 | 80 | 82 | 54 |
|---|---|---|---|---|---|---|
| Batt. Rev. | -3.25 | | | 0.00 | -1.00(M) | X |
| EVT Rev. | -8.33 | | | -0.39 | -3.17(M) | X |
| TC Rev. | -7.00 | | | -0.51 | -2.84(M) | X |
| TC For. | 4.69 | | | -0.39 | 0.83(M) | X |
| Range 1.1 | 4.69 | | | -0.39 | 0.83(M) | X |
| Range 1.2 | 3.45 | | | -0.39 | 0.45(M) | X |
| Range 1.3 | 2.53 | | | -0.39 | 0.17(M) | X |
| Range 1.4 | 1.86 | | | -0.39(M) | -0.04 | X |
| Range 2.1 | 1.36 | | X | -0.02 | 0.04(M) | |
| Range 2.2 | 1.00 | | X | 0.04(M) | -0.04 | |
| Range 2.3 | 0.74 | | X | 0.16(M) | -0.051 | |
| Range 2.4 | 0.54 | | X | 0.48(M) | 0.09 | |
| F1 | 3.26 | X | | | | X |
| F2 | 2.00 | | | X | | X |
| F3 | 1.00 | X | X | | | |
| F4 | 0.61 | | X | X | | |

Dual Mode (HS)   (X = ENGAGED CLUTCH)

SAMPLE DESIGN:

$\frac{\text{RING GEAR}}{\text{SUN GEAR}}$ TOOTH RATIO:

$\frac{N_{R1}}{N_{S1}} = 1.63,$ $\frac{N_{R2}}{N_{S2}} = 1.63,$ $\frac{N_{R3}}{N_{S3}} = 2.26$

| FIXED-RATIO MODE | |
|---|---|
| RATIO SPREAD | 5.34 |
| RATIO STEPS | |
| 1/2 | 1.63 |
| 2/3 | 2.00 |
| 3/4 | 1.64 |

| | RATIOS | 150 | 152 | 180 | 182 | 154 |
|---|---|---|---|---|---|---|
| Batt. Rev. | -3.07 | | | 0.00 | 1.00(M) | X |
| EVT Rev. | -8.33 | | | -0.39 | -3.32(M) | X |
| TC Rev. | -7.00 | | | -0.39 | -2.89(M) | X |
| TC For. | 4.69 | | | -0.39 | 0.92(M) | X |
| Range 1.1 | 4.69 | | | -0.39 | 0.92(M) | X |
| Range 1.2 | 3.45 | | | -0.39 | 0.52(M) | X |
| Range 1.3 | 2.53 | | | -0.39 | 0.22(M) | X |
| Range 1.4 | 1.86 | | | -0.39 | 0.00(M) | X |
| Range 2.1 | 1.36 | | X | -0.14 | 0.26(M) | |
| Range 2.2 | 1.00 | | X | -0.11 | 0.11(M) | |
| Range 2.3 | 0.74 | | X | -0.07 | 0.02(M) | |
| Range 2.4 | 0.54 | | X | 0.03 | 0.01(M) | |
| F1 | 3.04 | X | | | | X |
| F2 | 1.83 | | | | X | X |
| F3 | 1.00 | X | X | | | |
| F4 | 0.61 | | | X | X | |

Dual Mode (HS)　　(X = ENGAGED CLUTCH)

SAMPLE DESIGN:

$\dfrac{\text{RING GEAR}}{\text{SUN GEAR}}$ TOOTH RATIO:

$\dfrac{N_{R1}}{N_{S1}} = 2.94,$ $\dfrac{N_{R2}}{N_{S2}} = 1.54,$ $\dfrac{N_{R3}}{N_{S3}} = 2.07$

| FIXED-RATIO MODE | |
|---|---|
| RATIO SPREAD | 4.98 |
| RATIO STEPS | |
| 1/2 | 1.66 |
| 2/3 | 1.83 |
| 3/4 | 1.64 |

| | RATIOS | 250 | 252 | 280 | 282 | 254 |
|---|---|---|---|---|---|---|
| Batt. Rev. | -3.02 | | | 0.00 | -1.00(M) | X |
| EVT Rev. | -8.33 | | | -0.38 | -3.38(M) | X |
| TC Rev. | -7.00 | | | -0.38 | -2.94(M) | X |
| TC For. | 4.69 | | | -0.38 | 0.93(M) | X |
| Range 1.1 | 4.69 | | | -0.38 | 0.93(M) | X |
| Range 1.2 | 3.45 | | | -0.38 | 0.51(M) | X |
| Range 1.3 | 2.53 | | | -0.38 | 0.21(M) | X |
| Range 1.4 | 1.86 | | | -0.38(M) | -0.01 | X |
| Range 2.1 | 1.36 | | X | -0.08 | 0.15(M) | |
| Range 2.2 | 1.00 | | X | 0.004(M) | -0.004 | |
| Range 2.3 | 0.74 | | X | 0.21(M) | -0.06 | |
| Range 2.4 | 0.54 | | X | 2.18 | 0.5(M) | |
| F1 | 3.04 | X | | | | X |
| F2 | 1.90 | | | X | | X |
| F3 | 1.00 | X | X | | | |
| F4 | 0.63 | | X | X | | |

Dual Mode (HS)   (X = ENGAGED CLUTCH)

SAMPLE DESIGN:

$\frac{\text{RING GEAR}}{\text{SUN GEAR}}$ TOOTH RATIO:

$\frac{N_{R1}}{N_{S1}} = 1.50,$ $\frac{N_{R2}}{N_{S2}} = 2.99,$ $\frac{N_{R3}}{N_{S3}} = 2.04$

| FIXED-RATIO MODE | |
|---|---|
| RATIO SPREAD | 4.92 |
| RATIO STEPS | |
| 1/2 | 1.64 |
| 2/3 | 1.83 |
| 3/4 | 1.64 |

| | RATIOS | 350 | 352 | 380 | 382 | 354 |
|---|---|---|---|---|---|---|
| Batt. Rev. | -5.80 | | | -0.59 | -1.30(M) | X |
| EVT Rev. | -8.33 | | | -1.17 | -2.04(M) | X |
| TC Rev. | -7.00 | | | -1.04 | -1.74(M) | X |
| TC For. | 4.69 | | | 0.15(M) | 0.885 | X |
| Range 1.1 | 4.69 | | | 0.15(M) | 0.89 | X |
| Range 1.2 | 3.45 | | | 0.02(M) | 0.61 | X |
| Range 1.3 | 2.53 | | | -0.07 | 0.40(M) | X |
| Range 1.4 | 1.86 | | | -0.14 | 0.25(M) | X |
| Range 2.1 | 1.36 | | X | -0.19 | 1.31(M) | |
| Range 2.2 | 1.00 | | X | -0.17 | 0.23(M) | |
| Range 2.3 | 0.74 | | X | -0.25(M) | -0.01 | |
| Range 2.4 | 0.54 | | X | -0.27(M) | -0.14 | |
| F1 | 3.22 | | | | X | X |
| F2 | 1.56 | | X | | | X |
| F3 | 1.00 | X | | | | X |
| F4 | 0.75 | | | X | | X |

Dual Mode (HS)   (X = ENGAGED CLUTCH)

SAMPLE DESIGN:

$\dfrac{\text{RING GEAR}}{\text{SUN GEAR}}$ TOOTH RATIO:

$\dfrac{N_{R1}}{N_{S1}} = 3.00,$ $\dfrac{N_{R2}}{N_{S2}} = 2.20,$ $\dfrac{N_{R3}}{N_{S3}} = 3.00$

| FIXED-RATIO MODE | |
|---|---|
| RATIO SPREAD | 4.29 |
| RATIO STEPS | |
| 1/2 | 2.06 |
| 2/3 | 1.56 |
| 3/4 | 1.33 |

| | RATIOS | 450 | 452 | 480 | 482 | 454 |
|---|---|---|---|---|---|---|
| Batt. Rev. | -5.59 | | | -0.51 | -1.27(M) | X |
| EVT Rev. | -8.33 | | | -1.10 | -2.06(M) | X |
| TC Rev. | -7.00 | | | -0.96 | -1.76(M) | X |
| TC For. | 4.69 | | | 0.10(M) | 0.898 | X |
| Range 1.1 | 4.69 | | | 0.10(M) | 0.9 | X |
| Range 1.2 | 3.45 | | | -0.01 | 0.61(M) | X |
| Range 1.3 | 2.53 | | | -0.09 | 0.41(M) | X |
| Range 1.4 | 1.86 | | | -0.15 | 0.25(M) | X |
| Range 1.5 | 1.36 | | | -0.20 | 0.14(M) | X |
| Range 1.6 | 1.00 | | | -0.23 | 0.06(M) | X |
| Range 1.7 | 0.74 | | | -0.26(M) | -0.01 | X |
| Range 1.8 | 0.54 | | | -0.27(M) | -0.05 | X |
| F1 | 3.50 | | | | X | X |
| F2 | 1.54 | | X | | | X |
| F3 | 1.00 | X | | | | X |
| F4 | 0.75 | | | X | | X |

Single Mode        (X = ENGAGED CLUTCH)

SAMPLE DESIGN:

$\dfrac{\text{RING GEAR}}{\text{SUN GEAR}}$ TOOTH RATIO:

$\dfrac{N_{R1}}{N_{S1}} = 2.91,$ $\dfrac{N_{R2}}{N_{S2}} = 2.09,$ $\dfrac{N_{R3}}{N_{S3}} = 3.00$

| FIXED-RATIO MODE | |
|---|---|
| RATIO SPREAD | 4.67 |
| RATIO STEPS | |
| 1/2 | 2.27 |
| 2/3 | 1.54 |
| 3/4 | 1.33 |

| | RATIOS | 550 | 552 | 580 | 582 | 554 |
|---|---|---|---|---|---|---|
| Batt. Rev. | -5.57 | | | -0.51 | -1.27(M) | X |
| EVT Rev. | -8.33 | | | -1.08 | -2.06(M) | X |
| TC Rev. | -7.00 | | | -0.96 | -1.76(M) | X |
| TC For. | 4.69 | | | 0.10(M) | 0.90 | X |
| Range 1.1 | 4.69 | | | 0.10(M) | 0.90 | X |
| Range 1.2 | 3.45 | | | -0.01 | 0.62(M) | X |
| Range 1.3 | 2.53 | | | -0.09 | 0.41(M) | X |
| Range 1.4 | 1.86 | | | -0.15 | 0.25(M) | X |
| Range 2.1 | 1.36 | | X | -0.20 | 0.20(M) | |
| Range 2.2 | 1.00 | | X | -0.23 | 0.23(M) | |
| Range 2.3 | 0.74 | | X | -0.26(M) | 0.26 | |
| Range 2.4 | 0.54 | | X | -0.27(M) | 0.27 | |
| F1 | 3.50 | | | | X | X |
| F2 | 1.54 | | X | | | X |
| F3 | 1.00 | X | | | | X |
| F4 | 0.75 | | | X | | X |

Dual Mode (CS)   (X = ENGAGED CLUTCH)

SAMPLE DESIGN:

$\dfrac{\text{RING GEAR}}{\text{SUN GEAR}}$ TOOTH RATIO:

$\dfrac{N_{R1}}{N_{S1}} = 2.91,$ $\dfrac{N_{R2}}{N_{S2}} = 2.09,$ $\dfrac{N_{R3}}{N_{S3}} = 3.00$

| FIXED-RATIO MODE | |
|---|---|
| RATIO SPREAD | 4.67 |
| RATIO STEPS | |
| 1/2 | 2.27 |
| 2/3 | 1.54 |
| 3/4 | 1.33 |

| | RATIOS | 650 | 652 | 680 | 682 | 654 |
|---|---|---|---|---|---|---|
| Batt. Rev. | -3.79 | | | -0.10 | -1.23(M) | X |
| EVT Rev. | -8.33 | | | -0.55 | -3.73(M) | X |
| TC Rev. | -7.00 | | | -0.49 | -2.97(M) | X |
| TC For. | 4.69 | | | -0.18 | 0.83(M) | X |
| Range 1.1 | 4.69 | | | -0.18 | 0.83(M) | X |
| Range 1.2 | 3.45 | | | -0.21 | 0.42(M) | X |
| Range 1.3 | 2.53 | | | -0.24 | 0.13(M) | X |
| Range 1.4 | 1.86 | | | -0.26(M) | -0.09 | X |
| Range 2.1 | 1.36 | | X | -0.20 | 0.56(M) | |
| Range 2.2 | 1.00 | | X | -0.23 | 0.23(M) | |
| Range 2.3 | 0.74 | | X | -0.25(M) | -0.01 | |
| Range 2.4 | 0.54 | | X | -0.26(M) | -0.20 | |
| F1 | 4.00 | | X | | X | |
| F2 | 1.91 | | | X | | X |
| F3 | 1.00 | X | X | | | |
| F4 | 0.75 | X | X | | | |

Dual Mode (HS)  (X = ENGAGED CLUTCH)

SAMPLE DESIGN:

$\frac{\text{RING GEAR}}{\text{SUN GEAR}}$ TOOTH RATIO:

$\frac{N_{R1}}{N_{S1}} = 2.29,$ $\frac{N_{R2}}{N_{S2}} = 3.00,$ $\frac{N_{R3}}{N_{S3}} = 1.84$

| FIXED-RATIO MODE | |
|---|---|
| RATIO SPREAD | 5.33 |
| RATIO STEPS | |
| 1/2 | 2.09 |
| 2/3 | 1.91 |
| 3/4 | 1.33 |

| | RATIOS | 750 | 752 | 780 | 782 | 754 |
|---|---|---|---|---|---|---|
| Batt. Rev. | -5.80 | | | -0.59 | -1.30(M) | X |
| EVT Rev. | -8.33 | | | -1.17 | -2.04(M) | X |
| TC Rev. | -7.00 | | | -1.03 | -1.74(M) | X |
| TC For. | 4.69 | | | 0.15(M) | 0.89 | X |
| Range 1.1 | 4.69 | | | 0.15(M) | 0.89 | X |
| Range 1.2 | 3.45 | | | 0.02(M) | 0.61 | X |
| Range 1.3 | 2.53 | | | -0.07 | 0.40(M) | X |
| Range 1.4 | 1.86 | | | -0.14 | 0.25(M) | X |
| Range 1.5 | 1.36 | | | -0.19 | 0.14(M) | X |
| Range 1.6 | 1.00 | | | -0.22 | 0.06(M) | X |
| Range 1.7 | 0.74 | | | -0.25(M) | -0.01 | X |
| Range 1.8 | 0.54 | | | -0.27(M) | -0.05 | X |
| F1 | 3.22 | | | | X | X |
| F2 | 1.56 | | X | | X | |
| F3 | 1.00 | X | | | X | |
| F4 | 0.75 | | | X | X | |

Single Mode       (X = ENGAGED CLUTCH)

SAMPLE DESIGN:

$\dfrac{\text{RING GEAR}}{\text{SUN GEAR}}$ TOOTH RATIO:

$\dfrac{N_{R1}}{N_{S1}} = 3.00,$ $\dfrac{N_{R2}}{N_{S2}} = 2.22,$ $\dfrac{N_{R3}}{N_{S3}} = 3.00$

| FIXED-RATIO MODE | |
|---|---|
| RATIO SPREAD | 4.29 |
| RATIO STEPS | |
| 1/2 | 2.06 |
| 2/3 | 1.56 |
| 3/4 | 1.33 |

| | RATIOS | 850 | 852 | 880 | 882 | 854 |
|---|---|---|---|---|---|---|
| Batt. Rev. | -2.51 | | | -1.00(M) | -0.38 | X |
| EVT Rev. | -8.33 | | | -3.32(M) | -1.50 | X |
| TC Rev. | -7.00 | | | -1.82(M) | -0.93 | X |
| TC For. | 4.69 | | | 2.85 | 0.82(M) | X |
| Range 1.1 | 4.69 | | | 1.87 | 0.46(M) | X |
| Range 1.2 | 3.45 | | | 1.37 | 0.27(M) | X |
| Range 1.3 | 2.53 | | | 1.01 | 0.13(M) | X |
| Range 1.4 | 1.86 | | | 0.74 | 0.03(M) | X |
| Range 2.1 | 1.36 | | X | 0.43(M) | -0.07 | |
| Range 2.2 | 1.00 | | X | 0.15(M) | -0.15 | |
| Range 2.3 | 0.74 | | X | -0.05(X) | -0.21(M) | |
| Range 2.4 | 0.54 | | X | -0.21(X) | -0.25(M) | |
| F1 | 3.65 | | X | | | X |
| F2 | 1.66 | | X | X | | |
| F3 | 1.00 | X | X | | | |
| F4 | 0.81 | | X | | X | |

Dual Mode (HS)     (X = ENGAGED CLUTCH)

SAMPLE DESIGN:

$\frac{RING\ GEAR}{SUN\ GEAR}$ TOOTH RATIO:

$\frac{N_{R1}}{N_{S1}} = 3.00,$ $\frac{N_{R2}}{N_{S2}} = 2.65,$ $\frac{N_{R3}}{N_{S3}} = 3.00$

| FIXED-RATIO MODE | |
|---|---|
| RATIO SPREAD | 4.51 |
| RATIO STEPS | |
| 1/2 | 2.20 |
| 2/3 | 1.66 |
| 3/4 | 1.23 |

| | RATIOS | 950 | 952 | 980 | 982 | 954 |
|---|---|---|---|---|---|---|
| Batt. Rev. | -3.06 | | | 0.00 | -1.00(M) | X |
| EVT Rev. | -8.33 | | | -0.38 | -3.40(M) | X |
| TC Rev. | -7.00 | | | -0.38 | -2.94(M) | X |
| TC For. | 4.69 | | | -0.38 | 0.91(M) | X |
| Range 1.1 | 4.69 | | | -0.38 | 0.91(M) | X |
| Range 1.2 | 3.45 | | | -0.38 | 0.50(M) | X |
| Range 1.3 | 2.53 | | | -0.38 | 0.20(M) | X |
| Range 1.4 | 1.86 | | | -0.38(M) | -0.01 | X |
| Range 2.1 | 1.36 | | X | -0.38 | 0.73(M) | |
| Range 2.2 | 1.00 | | X | -0.38 | 0.73(M) | |
| Range 2.3 | 0.74 | | X | -0.38 | 0.11(M) | |
| Range 2.4 | 0.54 | | X | -0.38(M) | -0.08 | |
| F1 | 3.00 | X | | | | X |
| F2 | 1.87 | | | X | | X |
| F3 | 1.00 | X | X | | | |
| F4 | 0.62 | | X | X | | |

Dual Mode (HS)    (X = ENGAGED CLUTCH)

SAMPLE DESIGN:

$\frac{\text{RING GEAR}}{\text{SUN GEAR}}$ TOOTH RATIO:

$\frac{N_{R1}}{N_{S1}} = 2.62,$ $\frac{N_{R2}}{N_{S2}} = 1.68,$ $\frac{N_{R3}}{N_{S3}} = 2.06$

| FIXED-RATIO MODE | |
|---|---|
| RATIO SPREAD | 4.84 |
| RATIO STEPS | |
| 1/2 | 1.60 |
| 2/3 | 1.87 |
| 3/4 | 1.61 |

| | RATIOS | 1050 | 1052 | 1080 | 1082 | 1054 |
|---|---|---|---|---|---|---|
| Batt. Rev. | -3.06 | | | 0.00 | -1.00(M) | X |
| EVT Rev. | -8.33 | | | -0.38 | -3.40(M) | X |
| TC Rev. | -7.00 | | | -0.38 | -2.99(M) | X |
| TC For. | 4.69 | | | -0.38 | 0.93(M) | X |
| Range 1.1 | 4.69 | | | -0.38 | 0.94(M) | X |
| Range 1.2 | 3.45 | | | -0.38 | 0.53(M) | X |
| Range 1.3 | 2.53 | | | -0.38 | 0.22(M) | X |
| Range 1.4 | 1.86 | | | -0.38(M) | -0.01 | X |
| Range 2.1 | 1.36 | | X | -0.38 | 0.74(M) | |
| Range 2.2 | 1.00 | | X | -0.38 | 0.38(M) | |
| Range 2.3 | 0.74 | | X | -0.38 | 0.11(M) | |
| Range 2.4 | 0.54 | | X | -0.38(M) | -0.08 | |
| F1 | 3.00 | X | | | | X |
| F2 | 1.87 | | X | | | X |
| F3 | 1.00 | X | X | | | |
| F4 | 0.62 | | X | X | | |

Dual Mode (HS)    (X = ENGAGED CLUTCH)

SAMPLE DESIGN:

$$\frac{\text{RING GEAR}}{\text{SUN GEAR}} \text{ TOOTH RATIO:}$$

$$\frac{N_{R1}}{N_{S1}} = 1.67,$$

$$\frac{N_{R2}}{N_{S2}} = 1.65,$$

$$\frac{N_{R3}}{N_{S3}} = 2.00$$

| FIXED-RATIO MODE | |
|---|---|
| RATIO SPREAD | 4.84 |
| RATIO STEPS | |
| 1/2 | 1.60 |
| 2/3 | 1.87 |
| 3/4 | 1.61 |

| | RATIOS | 1150 | 1152 | 1180 | 1182 | 1154 |
|---|---|---|---|---|---|---|
| Batt. Rev. | -2.94 | | | 0.00 | 1.00(M) | X |
| EVT Rev. | -8.33 | | | -0.21 | 3.11(M) | X |
| TC Rev. | -7.00 | | | -0.21 | 2.66(M) | X |
| TC For. | 4.69 | | | -0.21 | -1.33(M) | X |
| Range 1.1 | 4.69 | | | -0.21 | -1.33(M) | X |
| Range 1.2 | 3.45 | | | -0.21 | -0.90(M) | X |
| Range 1.3 | 2.53 | | | -0.21 | -0.59(M) | X |
| Range 1.4 | 1.86 | | | -0.21 | -0.36(M) | X |
| Range 2.1 | 1.36 | | X | -0.07 | 0.43(M) | |
| Range 2.2 | 1.00 | | X | -0.16 | 0.16(M) | |
| Range 2.3 | 0.74 | | X | -0.22(M) | -0.04 | |
| Range 2.4 | 0.54 | | X | -0.27(M) | -0.19 | |
| F1 | 3.50 | | X | | | X |
| F2 | 1.64 | | X | | X | |
| F3 | 1.00 | X | X | | | |
| F4 | 0.79 | X | X | | | |

Dual Mode (HS)   (X = ENGAGED CLUTCH)

SAMPLE DESIGN:

$\dfrac{\text{RING GEAR}}{\text{SUN GEAR}}$ TOOTH RATIO:

$\dfrac{N_{R1}}{N_{S1}} = 2.77,$ $\dfrac{N_{R2}}{N_{S2}} = 2.50;$ $\dfrac{N_{R3}}{N_{S3}} = 2.94$

| FIXED-RATIO MODE | |
|---|---|
| RATIO SPREAD | 4.43 |
| RATIO STEPS | |
| 1/2 | 2.13 |
| 2/3 | 1.64 |
| 3/4 | 1.27 |

| | RATIOS | 1250 | 1252 | 1280 | 1282 | 1254 |
|---|---|---|---|---|---|---|
| Batt. Rev. | -4.79 | | X | -0.41 | 1.04(M) | |
| EVT Rev. | -8.33 | | | -0.68 | 2.95(M) | X |
| TC Rev. | -7.00 | | | -0.68 | 2.49(M) | X |
| TC For. | 4.69 | | | -0.68 | -1.49(M) | X |
| Range 1.1 | 4.69 | | | -0.68 | -1.50(M) | X |
| Range 1.2 | 3.45 | | | -0.68 | -1.07(M) | X |
| Range 1.3 | 2.53 | | | -0.68 | -0.76(M) | X |
| Range 1.4 | 1.86 | | | -0.68 | -0.53(M) | X |
| Range 2.1 | 1.36 | X | | -0.11 | 0.49(M) | |
| Range 2.2 | 1.00 | X | | -0.31 | 0.31(M) | |
| Range 2.3 | 0.74 | X | | -0.46 | 0.19(M) | |
| Range 2.4 | 0.54 | X | | -0.56 | 0.10(M) | |
| F1 | 3.29 | X | | | | X |
| F2 | 1.59 | X | | | X | |
| F3 | 1.00 | X | X | | | |
| F4 | 0.83 | X | | | X | |

Dual Mode (HS)    (X = ENGAGED CLUTCH)

SAMPLE DESIGN:

$\frac{\text{RING GEAR}}{\text{SUN GEAR}}$ TOOTH RATIO:

$\frac{N_{R1}}{N_{S1}} = 3.00,$ $\frac{N_{R2}}{N_{S2}} = 2.09,$ $\frac{N_{R3}}{N_{S3}} = 2.91$

| FIXED-RATIO MODE | |
|---|---|
| RATIO SPREAD | 3.96 |
| RATIO STEPS | |
| 1/2 | 2.07 |
| 2/3 | 1.59 |
| 3/4 | 1.20 |

| | RATIOS | 1350 | 1352 | 1380 | 1382 | 1354 |
|---|---|---|---|---|---|---|
| Batt. Rev. | -3.25 | | | 0.00 | -1.00(M) | X |
| EVT Rev. | -8.33 | | | -0.39 | -3.17(M) | X |
| TC Rev. | -7.00 | | | -0.51 | -2.84(M) | X |
| TC For. | 4.69 | | | -0.39 | 0.83(M) | X |
| Range 1.1 | 4.69 | | | -0.39 | 0.83(M) | X |
| Range 1.2 | 3.45 | | | -0.39 | 0.45(M) | X |
| Range 1.3 | 2.53 | | | -0.39 | 0.17(M) | X |
| Range 1.4 | 1.86 | | | -0.39(M) | -0.04 | X |
| Range 2.1 | 1.36 | | X | -0.05 | 0.02(M) | |
| Range 2.2 | 1.00 | | X | 0.04(M) | -0.04 | |
| Range 2.3 | 0.74 | | X | 0.04(M) | -0.12 | |
| Range 2.4 | 0.54 | | X | -0.01 | -0.21(M) | |
| F1 | 3.26 | X | | | | X |
| F2 | 2.00 | | | X | | X |
| F3 | 1.00 | X | X | | X | |
| F4 | 0.56 | | X | | | |

Dual Mode (CS)   (X = ENGAGED CLUTCH)

SAMPLE DESIGN:

$\frac{\text{RING GEAR}}{\text{SUN GEAR}}$ TOOTH RATIO:

$\frac{N_{R1}}{N_{S1}} = 1.63,$ $\frac{N_{R2}}{N_{S2}} = 1.63,$ $\frac{N_{R3}}{N_{S3}} = 2.26$

| FIXED-RATIO MODE | |
|---|---|
| RATIO SPREAD | 5.82 |
| RATIO STEPS | |
| 1/2 | 1.63 |
| 2/3 | 2.00 |
| 3/4 | 1.79 |

| | RATIOS | 1450 | 1452 | 1480 | 1482 | 1454 |
|---|---|---|---|---|---|---|
| Batt. Rev. | -3.25 | | | 0.00 | -1.00(M) | X |
| EVT Rev. | -8.33 | | | -0.39 | -3.17(M) | X |
| TC Rev. | -7.00 | | | -0.51 | -2.84(M) | X |
| TC For. | 4.69 | | | -0.39 | 0.83(M) | X |
| Range 1.1 | 4.69 | | | -0.39 | 0.83(M) | X |
| Range 1.2 | 3.45 | | | -0.39 | 0.45(M) | X |
| Range 1.3 | 2.53 | | | -0.39 | 0.17(M) | X |
| Range 1.4 | 1.86 | | | -0.39(M) | -0.04 | X |
| Range 2.1 | 1.36 | | X | -0.02 | 0.04(M) | |
| Range 2.2 | 1.00 | | X | 0.04(M) | -0.04 | |
| Range 2.3 | 0.74 | | X | 0.16(M) | -0.051 | |
| Range 2.4 | 0.54 | | X | 0.48(M) | 0.09 | |
| F1 | 3.26 | X | | | | X |
| F2 | 2.00 | | | X | | X |
| F3 | 1.00 | X | X | | | |
| F4 | 0.61 | | X | X | | |

Dual Mode (HS)    (X = ENGAGED CLUTCH)

SAMPLE DESIGN:

$\dfrac{\text{RING GEAR}}{\text{SUN GEAR}}$ TOOTH RATIO:

$\dfrac{N_{R1}}{N_{S1}} = 1.63,$ $\dfrac{N_{R2}}{N_{S2}} = 2.63,$ $\dfrac{N_{R3}}{N_{S3}} = 2.26$

| FIXED-RATIO MODE | |
|---|---|
| RATIO SPREAD | 5.34 |
| RATIO STEPS | |
| 1/2 | 1.63 |
| 2/3 | 2.00 |
| 3/4 | 1.64 |

ELECTRICALLY VARIABLE TRANSMISSION HAVING THREE PLANETARY GEAR SETS AND THREE FIXED INTERCONNECTIONS

TECHNICAL FIELD

The present invention relates to electrically variable transmissions with selective operation both in power-split variable speed ratio ranges and in fixed speed ratios, and having three planetary gear sets, two motor/generators and three or four clutches.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. A novel transmission system, which can be used with internal combustion engines and which can reduce fuel consumption and the emissions of pollutants, may be of great benefit to the public.

The wide variation in the demands that vehicles typically place on internal combustion engines increases fuel consumption and emissions beyond the ideal case for such engines. Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power output.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between engine and the remainder of the drive system, within the limits of the electric machinery. An electric storage battery used as a source of power for propulsion may be added to this arrangement, forming a series hybrid electric drive system.

The series hybrid system allows the engine to operate with some independence from the torque, speed and power required to propel a vehicle, so the engine may be controlled for improved emissions and efficiency. This system allows the electric machine attached to the engine to act as a motor to start the engine. This system also allows the electric machine attached to the remainder of the drive train to act as a generator, recovering energy from slowing the vehicle into the battery by regenerative braking. A series electric drive suffers from the weight and cost of sufficient electric machinery to transform all of the engine power from mechanical to electrical in the generator and from electrical to mechanical in the drive motor, and from the useful energy lost in these conversions.

A power-split transmission can use what is commonly understood to be "differential gearing" to achieve a continuously variable torque and speed ratio between input and output. An electrically variable transmission can use differential gearing to send a fraction of its transmitted power through a pair of electric motor/generators. The remainder of its power flows through another, parallel path that is all mechanical and direct, of fixed ratio, or alternatively selectable.

One form of differential gearing, as is well known to those skilled in this art, may constitute a planetary gear set. Planetary gearing is usually the preferred embodiment employed in differentially geared inventions, with the advantages of compactness and different torque and speed ratios among all members of the planetary gear set. However, it is possible to construct this invention without planetary gears, as by using bevel gears or other gears in an arrangement where the rotational speed of at least one element of a gear set is always a weighted average of speeds of two other elements.

A hybrid electric vehicle transmission system also includes one or more electric energy storage devices. The typical device is a chemical electric storage battery, but capacitive or mechanical devices, such as an electrically driven flywheel, may also be included. Electric energy storage allows the mechanical output power from the transmission system to the vehicle to vary from the mechanical input power from the engine to the transmission system. The battery or other device also allows for engine starting with the transmission system and for regenerative vehicle braking.

An electrically variable transmission in a vehicle can simply transmit mechanical power from an engine input to a final drive output. To do so, the electric power produced by one motor/generator balances the electrical losses and the electric power consumed by the other motor/generator. By using the above-referenced electrical storage battery, the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

A successful substitute for the series hybrid transmission is the two-range, input-split and compound-split electrically variable transmission now produced for transit buses, as disclosed in U.S. Pat. No. 5,931,757, issued Aug. 3, 1999, to Michael Roland Schmidt, commonly assigned with the present application, and hereby incorporated by reference in its entirety. Such a transmission utilizes an input means to receive power from the vehicle engine and a power output means to deliver power to drive the vehicle. First and second motor/generators are connected to an energy storage device, such as a battery, so that the energy storage device can accept power from, and supply power to, the first and second motor/generators. A control unit regulates power flow among the energy storage device and the motor/generators as well as between the first and second motor/generators.

Operation in first or second variable-speed-ratio modes of operation may be selectively achieved by using clutches in the nature of first and second torque transfer devices. In the first mode, an input-power-split speed ratio range is formed by the application of the first clutch, and the output speed of the transmission is proportional to the speed of one motor/generator. In the second mode, a compound-power-split speed ratio range is formed by the application of the second clutch, and the output speed of the transmission is not proportional to the speeds of either of the motor/generators, but is an algebraic linear combination of the speeds of the two motor/generators. Operation at a fixed transmission speed ratio may be selectively achieved by the application of both of the clutches. Operation of the transmission in a neutral mode may be selectively achieved by releasing both clutches, decoupling the engine and both electric motor/generators from the transmission output. The transmission incorporates at least one mechanical point in its first mode of operation and at least two mechanical points in its second mode of operation.

U.S. Pat. No. 6,527,658, issued Mar. 4, 2003 to Holmes et al, commonly assigned with the present application, and hereby incorporated by reference in its entirety, discloses an electrically variable transmission utilizing two planetary gear sets, two motor/generators and two clutches to provide input split, compound split, neutral and reverse modes of operation. Both planetary gear sets may be simple, or one may be individually compounded. An electrical control member regulates power flow among an energy storage device and the two motor/generators. This transmission provides two ranges or modes of electrically variable transmission (EVT) operation, selectively providing an input-power-split speed ratio range and a compound-power-split speed ratio range. One fixed speed ratio can also be selectively achieved.

SUMMARY OF THE INVENTION

The present invention provides a family of electrically variable transmissions offering several advantages over conventional automatic transmissions for use in hybrid vehicles, including improved vehicle acceleration performance, improved fuel economy via regenerative braking and electric-only idling and launch, and an attractive marketing feature. An object of the invention is to provide the best possible energy efficiency and emissions for a given engine. In addition, optimal performance, capacity, package size, and ratio coverage for the transmission are sought.

The electrically variable transmission family of the present invention provides low-content, low-cost electrically variable transmission mechanisms including first, second and third differential gear sets, a battery, two electric machines serving interchangeably as motors or generators, and three selectable torque-transfer devices (two clutches and one brake). Preferably, the differential gear sets are planetary gear sets, but other gear arrangements may be implemented, such as bevel gears or differential gearing to an offset axis.

In this description, the first, second, or third planetary gear sets may be counted first to third in any order (i.e., left to right, right to left, etc.).

Each of the three planetary gear sets has three members. The first, second or third member of each planetary gear set can be any one of a sun gear, ring gear or carrier.

Each carrier can be either a single-pinion carrier (simple) or a double-pinion carrier (compound).

The input shaft is continuously connected with at least one member of the planetary gear sets. The output shaft is continuously connected with at least one member of the planetary gear sets.

A first interconnecting member continuously connects a first member of the first planetary gear set and a first member of the second planetary gear set.

A second interconnecting member continuously connects a second member of the first planetary gear set with a second member of the second planetary gear set.

A third interconnecting member continuously connects a third member of the second planetary gear set with a first member of the third planetary gear set.

A first torque transfer device selectively connects a member of the first planetary gear set with another member of the first, second, or third planetary gear set.

A second torque transfer device selectively connects a member of the third planetary gear set with another member of the first, second or third planetary gear set, this pair of members being different from the ones connected by the first torque transfer device.

A third torque transfer device selectively connects a member of the third planetary gear set with a stationary member (transmission case).

The first motor/generator is mounted to the transmission case (or ground) and is continuously connected to either the first or second interconnecting member, or a member of the first planetary gear set.

The second motor/generator is mounted to the transmission case and is continuously connected to the first, second or third interconnecting member, or to a member of the third planetary gear set.

The first and/or second motor/generators preferably include a motor brake connected in parallel for braking rotation of the respective motor/generator.

The three selectable torque transfer devices (two clutches and one brake) are engaged singly, in combinations of two, or singly along with a selectively braked motor/generator to yield an EVT with a continuously variable range of speeds (including reverse) and four mechanically fixed forward speed ratios. Alternatively, the three torque transfer devices may be disengaged while both motor/generators are braked to provide a fixed speed ratio. A "fixed speed ratio" is an operating condition in which the mechanical power input to the transmission is transmitted mechanically to the output, and no power flow (i.e. almost zero) is present in the motor/generators. An electrically variable transmission that may selectively achieve several fixed speed ratios for operation near full engine power can be smaller and lighter for a given maximum capacity. Fixed ratio operation may also result in lower fuel consumption when operating under conditions where engine speed can approach its optimum without using the motor/generators. A variety of fixed speed ratios and variable ratio spreads can be realized by suitably selecting the tooth ratios of the planetary gear sets.

Each embodiment of the electrically variable transmission family disclosed has an architecture in which neither the transmission input nor output is directly connected to a motor/generator. This allows for a reduction in the size and cost of the electric motor/generators required to achieve the desired vehicle performance.

The first, second and third torque transfer devices, motor brake(s), and the first and second motor/generators are operable to provide five operating modes in the electrically variable transmission, including battery reverse mode, EVT reverse mode, reverse and forward launch modes, continuously variable transmission range mode, and fixed ratio mode.

As mentioned above, each motor/generator which is selectively braked requires a parallel brake to prevent rotation of the motor/generator. Such parallel brakes are only shown, by way of example, in FIGS. 1a and 4a to simplify the drawings, but would be required in parallel with any other motor/generator in any of the Figures which includes an "X" in its respective motor/generator column on the corresponding operating mode table.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including an electrically variable transmission incorporating a family member of the present invention;

FIG. 1b is an operating mode table and fixed ratio mode table depicting some of the operating characteristics of the powertrain shown in FIG. 1a;

FIG. 2a is a schematic representation of a powertrain having an electrically variable transmission incorporating another family member of the present invention;

FIG. 2b is an operating mode table and fixed ratio mode table depicting some of the operating characteristics of the powertrain shown in FIG. 2a;

FIG. 3a is a schematic representation of a powertrain having an electrically variable transmission incorporating another family member of the present invention;

FIG. 3b is an operating mode table and fixed ratio mode table depicting some of the operating characteristics of the powertrain shown in FIG. 3a;

FIG. 4a is a schematic representation of a powertrain having an electrically variable transmission incorporating another family member of the present invention;

FIG. 4b is an operating mode table and fixed ratio mode table depicting some of the operating characteristics of the powertrain shown in FIG. 4a;

FIG. 5a is a schematic representation of a powertrain having an electrically variable transmission incorporating another family member of the present invention;

FIG. 5b is an operating mode table and fixed ratio mode table depicting some of the operating characteristics of the powertrain shown in FIG. 5a;

FIG. 6a is a schematic representation of a powertrain having an electrically variable transmission incorporating another family member of the present invention;

FIG. 6b is an operating mode table and fixed ratio mode table depicting some of the operating characteristics of the powertrain shown in FIG. 6a;

FIG. 7a is a schematic representation of a powertrain having an electrically variable transmission incorporating another family member of the present invention;

FIG. 7b is an operating mode table and fixed ratio mode table depicting some of the operating characteristics of the powertrain shown in FIG. 7a;

FIG. 8a is a schematic representation of a powertrain having an electrically variable transmission incorporating another family member of the present invention;

FIG. 8b is an operating mode table and fixed ratio mode table depicting some of the operating characteristics of the powertrain shown in FIG. 8a;

FIG. 9a is a schematic representation of a powertrain having an electrically variable transmission incorporating another family member of the present invention;

FIG. 9b is an operating mode table and fixed ratio mode table depicting some of the operating characteristics of the powertrain shown in FIG. 9a;

FIG. 10a is a schematic representation of a powertrain having an electrically variable transmission incorporating another family member of the present invention;

FIG. 10b is an operating mode table and fixed ratio mode table depicting some of the operating characteristics of the powertrain shown in FIG. 10a;

FIG. 11a is a schematic representation of a powertrain having an electrically variable transmission incorporating another family member of the present invention;

FIG. 11b is an operating mode table and fixed ratio mode table depicting some of the operating characteristics of the powertrain shown in FIG. 11a;

FIG. 12a is a schematic representation of a powertrain having an electrically variable transmission incorporating another family member of the present invention;

FIG. 12b is an operating mode table and fixed ratio mode table depicting some of the operating characteristics of the powertrain shown in FIG. 12a;

FIG. 13a is a schematic representation of a powertrain having an electrically variable transmission incorporating another family member of the present invention;

FIG. 13b is an operating mode table and fixed ratio mode table depicting some of the operating characteristics of the powertrain shown in FIG. 13a;

FIG. 14a is a schematic representation of a powertrain having an electrically variable transmission incorporating another family member of the present invention;

FIG. 14b is an operating mode table and fixed ratio mode table depicting some of the operating characteristics of the powertrain shown in FIG. 14a;

FIG. 15a is a schematic representation of a powertrain having an electrically variable transmission incorporating another family member of the present invention; and FIG. 15b is an operating mode table and fixed ratio mode table depicting some of the operating characteristics of the powertrain shown in FIG. 15a.

DESCRIPTION OF THE PREFERRED EMBODIMENTS

Figures 1A, 1B:
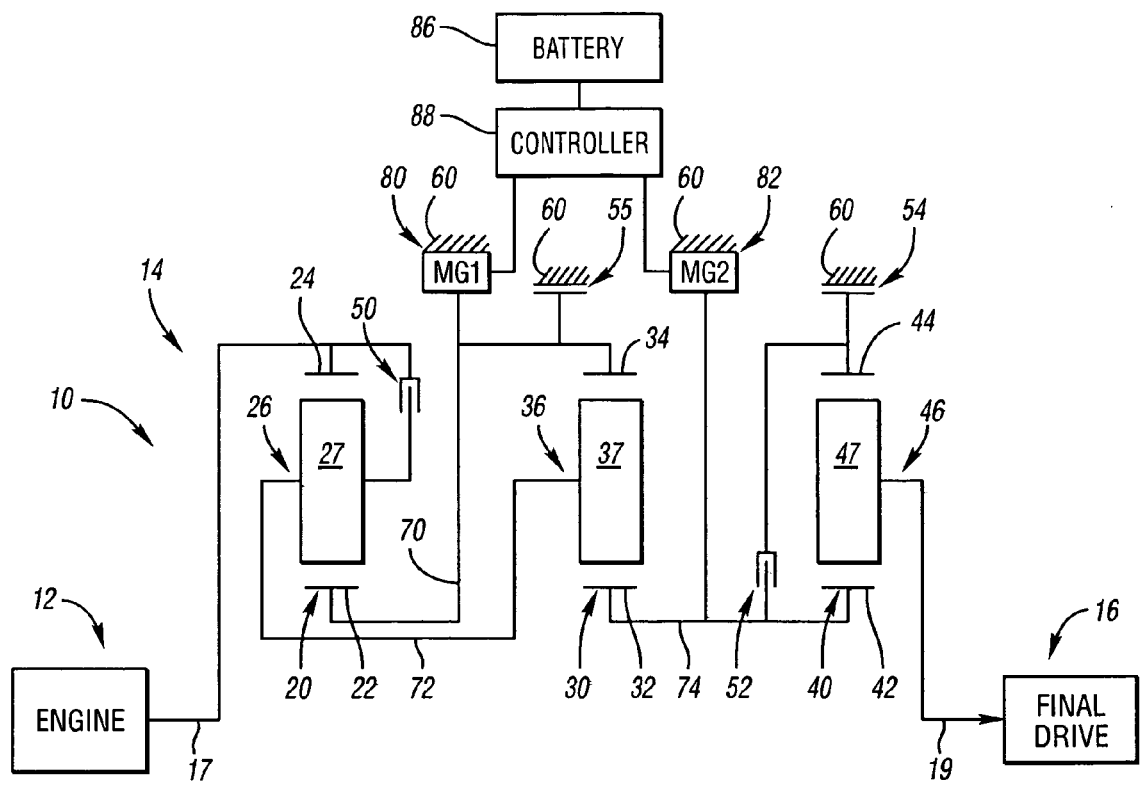

With reference to FIG. 1a, a powertrain 10 is shown, including an engine 12 connected to one preferred embodiment of the improved electrically variable transmission (EVT), designated generally by the numeral 14. Transmission 14 is designed to receive at least a portion of its driving power from the engine 12. As shown, the engine 12 has an output shaft that serves as the input member 17 of the transmission 14. A transient torque damper (not shown) may also be implemented between the engine 12 and the input member 17 of the transmission.

In the embodiment depicted the engine 12 may be a fossil fuel engine, such as a diesel engine which is readily adapted to provide its available power output typically delivered at a constant number of revolutions per minute (RPM).

Irrespective of the means by which the engine 12 is connected to the transmission input member 17, the transmission input member 17 is operatively connected to a planetary gear set 20 in the transmission 14.

An output member 19 of the transmission 14 is connected to a final drive 16.

The transmission 14 utilizes three differential gear sets, preferably in the nature of planetary gear sets 20, 30 and 40. The planetary gear set 20 employs an outer gear member 24, typically designated as the ring gear. The ring gear 24 circumscribes an inner gear member 22, typically designated as the sun gear. A carrier 26 rotatably supports a plurality of planet gears 27 such that each planet gear 27 meshingly engages both the outer, ring gear member 24 and the inner, sun gear member 22 of the first planetary gear set 20. The input member 17 is secured to the ring gear member 24 of the planetary gear set 20.

The planetary gear set 30 also has an outer gear member 34, often also designated as the ring gear, that circumscribes an inner gear member 32, also often designated as the sun gear. A plurality of planet gears 37 are also rotatably mounted in a carrier 36 such that each planet gear member 37 simultaneously, and meshingly, engages both the outer, ring gear member 34 and the inner, sun gear member 32 of the planetary gear set 30.

The planetary gear set 40 also has an outer gear member 44, often also designated as the ring gear, that circumscribes an inner gear member 42, also often designated as the sun gear. A plurality of planet gears 47 are also rotatably mounted in a carrier 46 such that each planet gear member 47 simultaneously, and meshingly, engages both the outer, ring gear member 44 and the inner, sun gear member 42 of the planetary gear set 40.

A first interconnecting member 70 continuously connects the sun gear 22 of the planetary gear set 20 with the ring gear 34 of the planetary gear set 30. A second interconnecting member 72 continuously connects the carrier 26 of the planetary gear set 20 with the carrier 36 of the planetary gear set 30. A third interconnecting member 74 continuously connects the sun gear 32 of the planetary gear set 30 with the sun gear 42 of the planetary gear set 40.

The first preferred embodiment 10 also incorporates first and second motor/generators 80 and 82, respectively. The stator of the first motor/generator 80 is secured to the transmission housing 60. The rotor of the first motor/generator 80 is secured to the first interconnecting member 70.

The stator of the second motor/generator 82 is also secured to the transmission housing 60. The rotor of the second motor/generator 82 is secured to the third interconnecting member 74.

A first torque transfer device, such as a clutch 50, selectively connects the ring gear 24 of the planetary gear set 20 to the carrier 26 of the planetary gear set 20. A second torque transfer device, such as clutch 52, selectively connects the sun gear 42 of the planetary gear set 40 with the ring gear 44 of the planetary gear set 40. A third torque transfer device, such as brake 54, selectively connects the ring gear 44 of the planetary gear set 40 with the transmission housing 60. That is, the ring gear 44 is selectively secured against rotation by an operative connection to the non-rotatable housing 60. The first, second and third torque transfer devices 50, 52 and 54 are employed to assist in the selection of the operational modes of the hybrid transmission 14, as will be hereinafter more fully explained. FIG. 1a also shows a sample brake 55 which is connected in parallel with the rotor of motor/generator 80, as will be described below.

The output drive member 19 of the transmission 14 is secured to the carrier 46 of the planetary gear set 40.

Returning now to the description of the power sources, it should be apparent from the foregoing description, and with particular reference to FIG. 1a, that the transmission 14 selectively receives power from the engine 12. The hybrid transmission also receives power from an electric power source 86, which is operably connected to a controller 88. The electric power source 86 may be one or more batteries. Other electric power sources, such as fuel cells, that have the ability to provide, or store, and dispense electric power may be used in place of batteries without altering the concepts of the present invention.

General Operating Considerations

One of the primary control devices is a well known drive range selector (not shown) that directs an electronic control unit (the ECU 88) to configure the transmission for either the park, reverse, neutral, or forward drive range. The second and third primary control devices constitute an accelerator pedal (not shown) and a brake pedal (also not shown). The information obtained by the ECU from these three primary control sources is designated as the "operator demand." The ECU also obtains information from a plurality of sensors (input as well as output) as to the status of: the torque transfer devices (either applied or released); the engine output torque; the unified battery, or batteries, capacity level; and, the temperatures of selected vehicular components. The ECU determines what is required and then manipulates the selectively operated components of, or associated with, the transmission appropriately to respond to the operator demand.

The invention may use simple or compound planetary gear sets. In a simple planetary gear set a single set of planet gears are normally supported for rotation on a carrier that is itself rotatable.

In a simple planetary gear set, when the sun gear is held stationary and power is applied to the ring gear of a simple planetary gear set, the planet gears rotate in response to the power applied to the ring gear and thus "walk" circumferentially about the fixed sun gear to effect rotation of the carrier in the same direction as the direction in which the ring gear is being rotated.

When any two members of a simple planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive. That is, the carrier rotates with the sun and ring gears.

However, when the two gear members rotate in the same direction, but at different speeds, the direction in which the third gear member rotates may often be determined simply by visual analysis, but in many situations the direction will not be obvious and can only be accurately determined by knowing the number of teeth present on all the gear members of the planetary gear set.

Whenever the carrier is restrained from spinning freely, and power is applied to either the sun gear or the ring gear, the planet gear members act as idlers. In that way the driven member is rotated in the opposite direction as the drive member. Thus, in many transmission arrangements when the reverse drive range is selected, a torque transfer device serving as a brake is actuated frictionally to engage the carrier and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

In a simple set of planetary gears, if any two rotational speeds of the sun gear, the planet carrier, and the ring gear are known, then the speed of the third member can be determined using a simple rule. The rotational speed of the carrier is always proportional to the speeds of the sun and the ring, weighted by their respective numbers of teeth. For example, a ring gear may have twice as many teeth as the sun gear in the same set. The speed of the carrier is then the sum of two-thirds the speed of the ring gear and one-third the speed of the sun gear. If one of these three members rotates in an opposite direction, the arithmetic sign is negative for the speed of that member in mathematical calculations.

The torque on the sun gear, the carrier, and the ring gear can also be simply related to one another if this is done without consideration of the masses of the gears, the acceleration of the gears, or friction within the gear set, all of which have a relatively minor influence in a well designed transmission. The torque applied to the sun gear of a simple planetary gear set must balance the torque applied to the ring gear, in proportion to the number of teeth on each of these gears. For example, the torque applied to a ring gear with twice as many teeth as the sun gear in that set must be twice that applied to the sun gear, and must be applied in the same direction. The torque applied to the carrier must be equal in magnitude and opposite in direction to the sum of the torque on the sun gear and the torque on the ring gear.

In a compound planetary gear set, the utilization of inner and outer sets of planet gears effects an exchange in the roles of the ring gear and the planet carrier in comparison to a simple planetary gear set. For instance, if the sun gear is held stationary, the planet carrier will rotate in the same direction as the ring gear, but the planet carrier with inner and outer sets of planet gears will travel faster than the ring gear, rather than slower.

In a compound planetary gear set having meshing inner and outer sets of planet gears the speed of the ring gear is proportional to the speeds of the sun gear and the planet carrier, weighted by the number of teeth on the sun gear and the number of teeth filled by the planet gears, respectively. For example, the difference between the ring and the sun filled by the planet gears might be as many teeth as are on the sun gear in the same set. In that situation the speed of the ring gear would be the sum of two-thirds the speed of the carrier and one third the speed of the sun. If the sun gear or the planet carrier rotates in an opposite direction, the arithmetic sign is negative for that speed in mathematical calculations.

If the sun gear were to be held stationary, then a carrier with inner and outer sets of planet gears will turn in the same direction as the rotating ring gear of that set. On the other hand, if the sun gear were to be held stationary and the carrier were to be driven, then planet gears in the inner set that engage the sun gear roll, or "walk," along the sun gear, turning in the same direction that the carrier is rotating. Pinion gears in the outer set that mesh with pinion gears in the inner set will turn in the opposite direction, thus forcing a meshing ring gear in the opposite direction, but only with respect to the planet gears with which the ring gear is meshingly engaged. The planet gears in the outer set are being carried along in the direction of the carrier. The effect of the rotation of the pinion gears in the outer set on their own axis and the greater effect of the orbital motion of the planet gears in the outer set due to the motion of the carrier are combined, so the ring rotates in the same direction as the carrier, but not as fast as the carrier.

If the carrier in such a compound planetary gear set were to be held stationary and the sun gear were to be rotated, then the ring gear will rotate with less speed and in the same direction as the sun gear. If the ring gear of a simple planetary gear set is held stationary and the sun gear is rotated, then the carrier supporting a single set of planet gears will rotate with less speed and in the same direction as the sun gear. Thus, one can readily observe the exchange in roles between the carrier and the ring gear that is caused by the use of inner and outer sets of planet gears which mesh with one another, in comparison with the usage of a single set of planet gears in a simple planetary gear set.

The normal action of an electrically variable transmission is to transmit mechanical power from the input to the output. As part of this transmission action, one of its two motor/generators acts as a generator of electrical power. The other motor/generator acts as a motor and uses that electrical power. As the speed of the output increases from zero to a high speed, the two motor/generators 80, 82 gradually exchange roles as generator and motor, and may do so more than once. These exchanges take place around mechanical points, where essentially all of the power from input to output is transmitted mechanically and no substantial power is transmitted electrically.

In a hybrid electrically variable transmission system, the battery 86 may also supply power to the transmission or the transmission may supply power to the battery. If the battery is supplying substantial electric power to the transmission, such as for vehicle acceleration, then both motor/generators may act as motors. If the transmission is supplying electric power to the battery, such as for regenerative braking, both motor/generators may act as generators. Very near the mechanical points of operation, both motor/generators may also act as generators with small electrical power outputs, because of the electrical losses in the system.

Contrary to the normal action of the transmission, the transmission may actually be used to transmit mechanical power from the output to the input. This may be done in a vehicle to supplement the vehicle brakes and to enhance or to supplement regenerative braking of the vehicle, especially on long downward grades. If the power flow through the transmission is reversed in this way, the roles of the motor/generators will then be reversed from those in normal action.

Specific Operating Considerations

Each of the embodiments described herein has sixteen functional requirements (corresponding with the 16 rows of each operating mode table shown in the Figures) which may be grouped into five operating modes. These five operating modes are described below and may be best understood by referring to the respective operating mode table accompanying each transmission stick diagram, such as the operating mode tables of FIG. 1b, 2b, 3b, etc.

The first operating mode is the "battery reverse mode" which corresponds with the first row (Batt Rev) of each operating mode table, such as that of FIG. 1b. In this mode, the engine is off and the transmission element connected to the engine is not controlled by engine torque, though there may be some residual torque due to the rotational inertia of the engine. The EVT is driven by one of the motor/generators using energy from the battery, causing the vehicle to move in reverse. Depending on the kinematic configuration, the other/motor/generator may or may not rotate in this mode, and may or may not transmit torque. If it does rotate, it is used to generate energy which is stored in the battery. In the embodiment of FIG. 1b, in the battery reverse mode, the brake 54 is engaged, the motor/generator 80 has zero torque, the motor/generator 82 has a torque of −1.00 units A torque ratio of −3.25 is achieved, by way of example. In each operating mode table an (M) next to a torque value in the motor/generator columns 80 and 82 indicates that the motor/generator is acting as a motor, and the absence of an (M) indicates that the motor/generator is acting as generator.

The second operating mode is the "EVT reverse mode" which corresponds with the second row (EVT Rev) of each operating mode table, such as that of FIG. 1b. In this mode, the EVT is driven by the engine and by one of the motor/generators. The other motor/generator operates in generator mode and transfers 100% of the generated energy back to the driving motor. The net effect is to drive the vehicle in reverse. Referring to FIG. 1b, for example, in the EVT reverse mode, the brake 54 is engaged, the generator 80 has a torque of −0.39 units, the motor 82 has a torque of −3.17 units, and an output torque of −8.33 is achieved, corresponding to an engine torque of 1 unit.

The third operating mode includes the "reverse and forward launch modes" (also referred to as "torque converter reverse and forward modes") corresponding with the third and fourth rows (TC Rev and TC For) of each operating mode table, such as that of FIG. 1b. In this mode, the EVT is driven by the engine and one of the motor/generators. A selectable fraction of the energy generated in the generator unit is stored in the battery, with the remaining energy being transferred to the motor. In FIG. 1, this fraction is approximately 99%. The ratio of transmission output speed to engine speed (transmission speed ratio) is approximately +/−0.001 (the positive sign indicates that the vehicle is creeping forward and negative sign indicates that the vehicle is creeping backwards). Referring to FIG. 1b, in the reverse and forward launch modes, the brake 54 is engaged, and the motor/generator 80 acts as a generator (with −0.51 or −0.39 units of torque), the motor/generator 82 acts as a motor (with −2.84 or 0.83 units of torque), and a torque ratio of −7.00 or 4.69 is achieved.

The fourth operating mode is a "continuously variable transmission range mode" which includes the Range 1.1, Range 1.2, Range 1.3, Range 1.4, Range 2.1, Range 2.2, Range 2.3 and Range 2.4 operating points corresponding with rows 5–12 of each operating point table, such as that of FIG. 1b. In this mode, the EVT is driven by the engine as well as one of the motor/generators operating as a motor. The other motor/generator operates as a generator and transfers 100% of the generated energy back to the motor. The operating points represented by Range 1.1, 1.2, . . . , etc. are discrete points in the continuum of forward speed ratios provided by the EVT. For example in FIG. 1b, a range of torque ratios from 4.69 to 1.86 is achieved with the brake 54 engaged, and a range of ratios 1.86 to 0.54 is achieved with the clutch 52 engaged.

The fifth operating mode includes the "fixed ratio" modes (F1, F2, F3 and F4) corresponding with rows 13–16 of each operating mode table (i.e. operating mode table), such as that of FIG. 1b. In this mode the transmission operates like a conventional automatic transmission, with two torque transfer devices engaged to create a discrete transmission ratio, or one torque-transfer device may be engaged while one motor/generator is braked. Alternatively, all three torque transfer devices could be disengaged while both motor/generators are braked. The clutching table accompanying each figure shows only 4 fixed-ratio forward speeds but additional fixed ratios may be available. Referring to FIG. 1b, in fixed ratio F1 the clutch 50 and brake 54 are engaged to achieve a fixed torque ratio of 3.26. In fixed ratio F2, the brake 54 is engaged and the motor/generator 80 is braked (i.e., by a parallel mechanical brake, such as the brake 55 shown in FIG. 1a) to achieve a fixed ratio of 2.00. Accordingly, each "X" in the column of motor/generator 80 in FIG. 1b indicates that the brake 55 is engaged and the motor/generator 80 is not rotating. Such parallel brakes are only shown, by way of example, in FIGS. 1a and 4a to simplify the drawings, but would be required in parallel with any other motor/generator in any of the Figures which includes an "X" in its respective motor/generator column on the corresponding operating mode table. In fixed ratio F3, the clutches 50 and 52 are engaged to achieve a fixed ratio of 1.00. In fixed ratio F4, the clutch 52 is engaged and the motor/generator 80 is braked to achieve a fixed ratio of 0.61.

The transmission 14 is capable of operating in so-called single or dual modes. In single mode, the engaged torque transfer device remains the same for the entire continuum of forward speed ratios (represented by the discrete points: Ranges 1.1, 1.2, 1.3 and 1.4). In dual mode, the engaged torque transfer device is switched at some intermediate speed ratio (e.g., Range 2.1 in FIG. 1). Depending on the mechanical configuration, this change in torque transfer device engagement has advantages in reducing element speeds in the transmission.

In some designs, it is possible to synchronize clutch element slip speeds such that shifts are achievable with minimal torque disturbance (so-called "cold" shifts). For example, the transmissions of FIGS. 6a and 14a have cold shifts between ranges 1.4 and 2.1. This also serves as an enabler for superior control during double transition shifts (two oncoming clutches and two off-going clutches).

As set forth above, the engagement schedule for the torque transfer devices is shown in the operating mode table and fixed ratio mode table of FIG. 1b. FIG. 1b also provides an example of torque ratios that are available utilizing the ring gear/sun gear tooth ratios given by way of example in FIG. 1b. The $N_{R1}/N_{S1}$ value is the tooth ratio of the planetary gear set 20; the $N_{R2}/N_{S2}$ value is the tooth ratio of the planetary gear set 30; and the $N_{R3}/N_{S3}$ value is the tooth ratio of the planetary gear set 40. Also, the chart of FIG. 1b describes the ratio steps that are attained utilizing the sample of tooth ratios given. For example, the step ratio between first and second fixed forward torque ratios is 1.63, the step ratio between the second and third fixed forward torque ratios is 2.00, the step ratio between the second and third fixed forward torque ratios is 1.64, and the ratio spread is 5.34.

Description of a Second Exemplary Embodiment

Figures 2A, 2B:
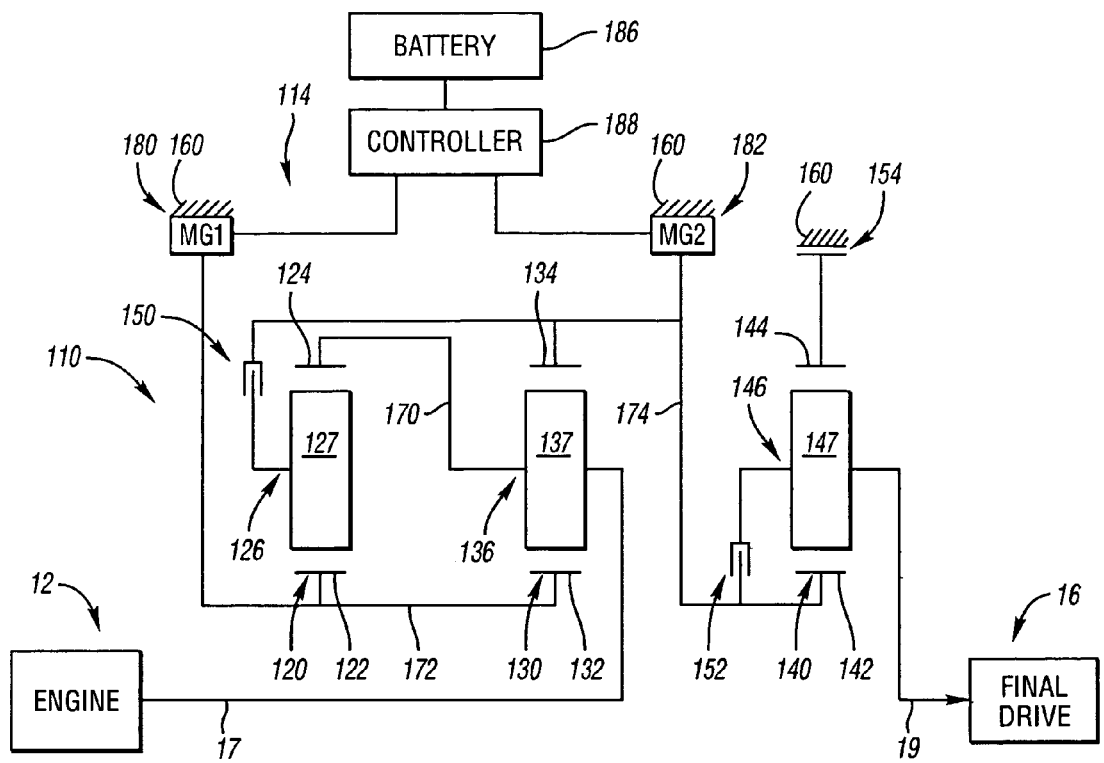

With reference to FIG. 2a, a powertrain 110 is shown, including an engine 12 connected to one preferred embodiment of the improved electrically variable transmission, designated generally by the numeral 114. Transmission 114 is designed to receive at least a portion of its driving power from the engine 12.

In the embodiment depicted the engine 12 may also be a fossil fuel engine, such as a diesel engine which is readily adapted to provide its available power output typically delivered at a constant number of revolutions per minute (RPM). As shown, the engine 12 has an output shaft that serves as the input member 17 of the transmission 14. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 114. An output member 19 of the transmission 114 is connected to a final drive 16.

The transmission 114 utilizes three differential gear sets, preferably in the nature of planetary gear sets 120, 130 and 140. The planetary gear set 120 employs an outer gear member 124, typically designated as the ring gear. The ring gear 124 circumscribes an inner gear member 122, typically designated as the sun gear. A carrier 126 rotatably supports a plurality of planet gears 127 such that each planet gear 127 meshingly engages both the outer, ring gear member 124 and the inner, sun gear member 122 of the first planetary gear set 120.

The planetary gear set 130 also has an outer gear member 134, often also designated as the ring gear, that circumscribes an inner gear member 132, also often designated as the sun gear. A plurality of planet gears 137 are also rotatably mounted in a carrier 136 such that each planet gear member 137 simultaneously, and meshingly, engages both the outer, ring gear member 134 and the inner, sun gear member 132 of the planetary gear set 130.

The planetary gear set 140 also has an outer gear member 144, often also designated as the ring gear, that circumscribes an inner gear member 142, also often designated as the sun gear. A plurality of planet gears 147 are also rotatably mounted in a carrier 146 such that each planet gear member 147 simultaneously, and meshingly, engages both the outer, ring gear member 144 and the inner, sun gear member 142 of the planetary gear set 140.

The transmission input member 17 is connected with the carrier 136 of the planetary gear set 130, and the transmission output member 19 is connected with the carrier 146 of the planetary gear set 140. A first interconnecting member 170 continuously connects the ring gear 124 of the planetary gear set 120 with the carrier 136 of the planetary gear set 130. A second interconnecting member 172 continuously connects the sun gear 122 of the planetary gear set 120 with the sun gear 132 of the planetary gear set 130. A third interconnecting member 174 continuously connects the ring gear 134 of the planetary gear set 130 with the sun gear 142 of the planetary gear set 140.

The transmission 114 also incorporates first and second motor/generators 180 and 182, respectively. The stator of the first motor/generator 180 is secured to the transmission housing 160. The rotor of the first motor/generator 180 is secured to the sun gear 122 of the planetary gear set 120.

The stator of the second motor/generator 182 is also secured to the transmission housing 160. The rotor of the second motor/generator 182 is secured to the third interconnecting member 174.

A first torque transfer device, such as a clutch 150, selectively connects the carrier 126 of the planetary gear set 120 to the ring gear 134 of the planetary gear set 130. A second torque transfer device, such as clutch 152, selectively connects the carrier 146 of the planetary gear set 140 with the sun gear 142 of the planetary gear set 140. A third torque transfer device, such as brake 154, selectively connects the ring gear 144 of the planetary gear set 140 with the transmission housing 160. That is, the ring gear 144 is selectively secured against rotation by an operative connection to the non-rotatable housing 160. The first, second and third torque transfer devices 150, 152 and 154 are employed to assist in the selection of the operational modes of the hybrid transmission 14.

Returning now to the description of the power sources, it should be apparent from the foregoing description, and with particular reference to FIG. 2a, that the transmission 114 selectively receives power from the engine 12. The hybrid transmission also exchanges power with an electric power source 186, which is operably connected to a controller 188. The electric power source 186 may be one or more batteries. Other electric power sources, such as fuel cells, that have the ability to provide, or store, and dispense electric power may be used in place of batteries without altering the concepts of the present invention.

As described previously, each embodiment has sixteen functional requirements (corresponding with the 16 rows of each operating mode table shown in the Figures) which may be grouped into five operating modes. The first operating mode is the "battery reverse mode" which corresponds with the first row (Batt Rev) of the operating mode table of FIG. 1b. In this mode, the engine is off and the transmission element connected to the engine is effectively allowed to freewheel, subject to engine inertia torque. The EVT is driven by one of the motor/generators using energy from the battery, causing the vehicle to move in reverse. The other motor/generator may or may not rotate in this mode. As shown in FIG. 1b, in this mode the brake 154 is engaged, the motor/generator 180 has zero torque, the motor/generator 182 has a torque of 1.00 unit and an output torque of −3.07 is achieved, by way of example.

The second operating mode is the "EVT reverse mode" which corresponds with the second row (EVT Rev) of the operating mode table of FIG. 2b. In this mode, the EVT is driven by the engine and by one of the motor/generators. The other motor/generator operates in generator mode and transfers 100% of the generated energy back to the driving motor. The net effect is to drive the vehicle in reverse. In this mode, the brake 154 is engaged, the generator 180 has a torque of −0.39 units, the motor 182 has a torque of −3.32 units, and an output torque of −8.33 is achieved, corresponding to an input torque of 1 unit.

The third operating mode includes the "reverse and forward launch modes" corresponding with the third and fourth rows (TC Rev and TC For) of each operating mode table, such as that of FIG. 2b. In this mode, the EVT is driven by the engine and one of the motor/generators. A selectable fraction of the energy generated in the generator unit is stored in the battery, with the remaining energy being transferred to the motor. In this mode, the brake 154 is engaged, and the motor/generator 180 acts as a generator (with −0.39 units of torque in reverse and forward), the motor/generator 182 acts as a motor (with −2.89 or 0.92 units of torque), and a torque ratio of −7.00 or 4.69 is achieved. For these torque ratios, approximately 99% of the generator energy is stored in the battery.

The fourth operating mode includes the "Range 1.1, Range 1.2, Range 1.3, Range 1.4, Range 2.1, Range 2.2, Range 2.3 and Range 2.4" modes corresponding with rows 5–12 of the operating mode table of FIG. 2b. In this mode, the EVT is driven by the engine as well as one of the motor/generators operating as a motor. The other motor/generator operates as a generator and transfers 100% of the generated energy back to the motor. The operating points represented by Range 1.1, 1.2, . . . , etc. are discrete points in the continuum of forward speed ratios provided by the EVT. For example in FIG. 2b, a range of ratios from 4.69 to 1.86 is achieved with the brake 154 engaged, and a range of ratios from 1.36 to 0.54 is achieved with the clutch 152 engaged.

The fifth operating mode includes the fixed "ratio" modes (F1, F2, F3 and F4) corresponding with rows 13–16 of the operating mode table of FIG. 2b. In this mode the transmission operates like a conventional automatic transmission, with two torque transfer devices engaged to create a discrete transmission ratio, or one torque-transfer device may be engaged while one motor/generator is braked. In fixed ratio F1 the clutch 150 and brake 154 are engaged to achieve a fixed ratio of 3.04. In fixed ratio F2, the brake 154 is engaged and the motor/generator 180 is braked (by a parallel brake which is not shown) to achieve a fixed ratio of 1.83. In fixed ratio F3, the clutches 150 and 152 are engaged to achieve a fixed ratio of 1.00. In fixed ratio F4, the clutch 152 is engaged and the motor/generator 180 is braked to achieve a fixed ratio of 0.61.

As set forth above, the engagement schedule for the torque transfer devices is shown in the operating mode table and fixed ratio mode table of FIG. 2b. FIG. 2b also provides an example of torque ratios that are available utilizing the ring gear/sun gear tooth ratios given by way of example in FIG. 2b. The $N_{R1}/N_{S1}$ value is the tooth ratio of the planetary gear set 120; the $N_{R2}/N_{S2}$ value is the tooth ratio of the planetary gear set 130; and the $N_{R3}/N_{S3}$ value is the tooth ratio of the planetary gear set 140. Also, the chart of FIG. 2b describes the ratio steps that are attained utilizing the sample of tooth ratios given. For example, the step ratio between first and second fixed forward torque ratios is 1.66, the step ratio between the second and third fixed forward torque ratios is 1.83, and the step ratio between the third and fourth fixed forward torque ratios is 1.64.

Description of a Third Exemplary Embodiment

Figures 3A, 3B:
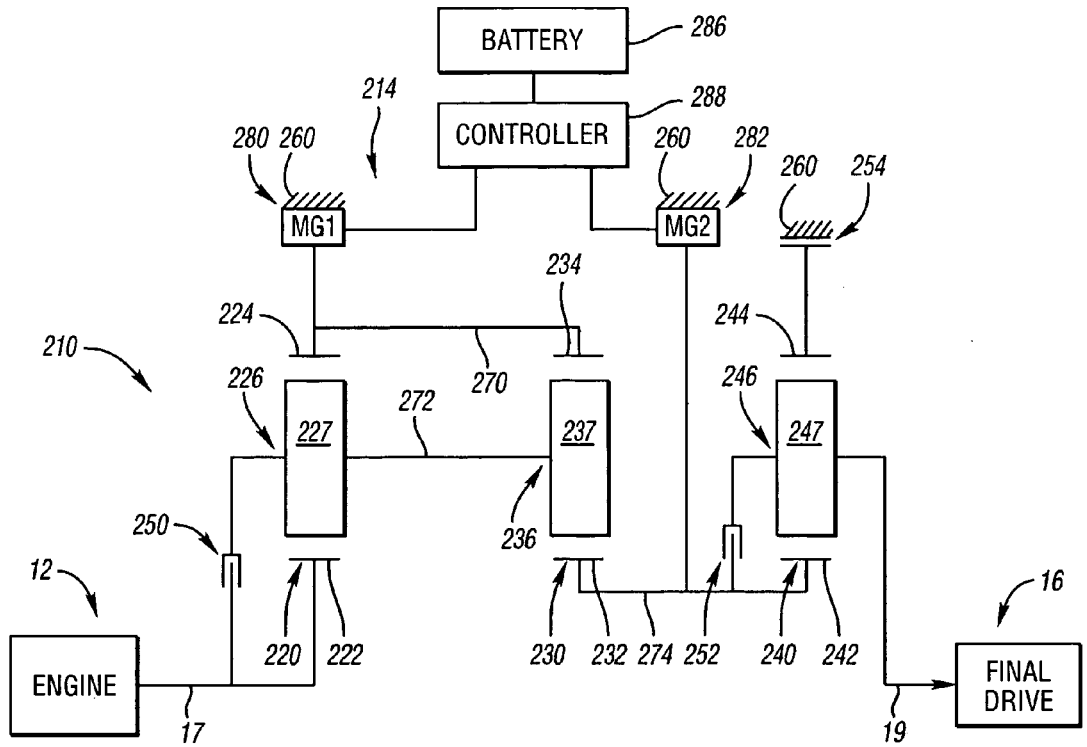

With reference to FIG. 3a, a powertrain 210 is shown, including an engine 12 connected to one preferred embodiment of the improved electrically variable transmission, designated generally by the numeral 214. The transmission 214 is designed to receive at least a portion of its driving power from the engine 12. As shown, the engine 12 has an output shaft that serves as the input member 17 of the transmission 214. A transient torque damper (not shown) may also be implemented between the engine 12 and the input member 17 of the transmission 214.

Irrespective of the means by which the engine 12 is connected to the transmission input member 17, the transmission input member is operatively connected to a planetary gear set in the transmission 214. An output member 19 of the transmission 214 is connected to a final drive 16.

The transmission 214 utilizes three differential gear sets, preferably in the nature of planetary gear sets 220, 230 and 240. The planetary gear set 220 employs an outer gear member 224, typically designated as the ring gear. The ring gear 224 circumscribes an inner gear member 222, typically designated as the sun gear. A carrier 226 rotatably supports a plurality of planet gears 227 such that each planet gear 227 meshingly engages both the outer, ring gear member 224 and the inner, sun gear member 222 of the first planetary gear set 220.

The planetary gear set 230 also has an outer ring gear member 234 that circumscribes an inner sun gear member 232. A plurality of planet gears 237 are also rotatably mounted in a carrier 236 such that each planet gear 237 simultaneously, and meshingly, engages both the outer ring gear member 234 and the inner sun gear member 232 of the planetary gear set 230. The planetary gear set 240 also has an outer ring gear member 244 that circumscribes an inner sun gear member 242. A plurality of planet gears 247 are rotatably mounted in a carrier 246 such that each planet gear member 247 simultaneously and meshingly engages both the outer, ring gear member 244 and the inner, sun gear member 242 of the planetary gear set 240. The transmission input member 17 is connected with the sun gear 222, and the transmission output member 19 is connected to the carrier 246. A first interconnecting member 270 continuously connects the ring gear 224 of the planetary gear set 220 with the ring gear 234 of the planetary gear set 230. A second interconnecting member 272 connects the carrier 226 of the planetary gear set 220 with the carrier 236 of the planetary gear set 230. A third interconnecting member 274 continuously connects the sun gear 232 of the planetary gear set 230 with the sun gear 242 of the planetary gear set 240.

The transmission 214 also incorporates first and second motor/generators 280 and 282, respectively. The stator of the first motor/generator 280 is secured to the transmission housing 260. The rotor of the first motor/generator 280 is secured to the ring gear 224 of the planetary gear set 220.

The stator of the second motor/generator 282 is also secured to the transmission housing 260. The rotor of the second motor/generator 282 is secured to the third interconnecting member 274.

A first torque-transfer device, such as clutch 250, selectively connects the carrier 226 of the planetary gear set 220 with the sun gear 222 of the planetary gear set 220. A second torque-transfer device, such as clutch 252, selectively connects the carrier 246 of the planetary gear set 240 with the sun gear 242 of the planetary gear set 240. A third torque-transfer device, such as a brake 254, selectively connects the ring gear 244 of the planetary gear set 240 with the transmission housing 260. The first, second and third torque-transfer devices 250, 252 and 254 are employed to assist in the selection of the operational modes of the hybrid transmission 214.

The hybrid transmission 214 receives power from the engine 12, and also from electric power source 286, which is operably connected to a controller 288.

The operating mode table of FIG. 3b illustrates the clutching engagements, motor/generator conditions and output/input ratios for the five operating modes of the transmission 214. These modes include the "battery reverse mode" (Batt Rev), "EVT reverse mode" (EVT Rev), "reverse and forward launch modes" (TC Rev and TC For), "range 1.1, 1.2, 1.3 . . . modes" and "fixed ratio modes" (F1, F2, F3, F4) as described previously.

As set forth above the engagement schedule for the torque-transfer devices is shown in the operating mode table and fixed ratio mode table of FIG. 3b. FIG. 3b also provides an example of torque ratios that are available utilizing the ring gear/sun gear tooth ratios given by way of example in FIG. 3b. The $N_{R1}/N_{S1}$ value is the tooth ratio of the planetary gear set 220; the $N_{R2}/N_{S2}$ value is the tooth ratio of the planetary gear set 230; and the $N_{R3}/N_{S3}$ value is the tooth ratio of the planetary gear set 240. Also, the chart of FIG. 3b describes the ratio steps that are attained utilizing the sample of tooth ratios given. For example, the step ratio between the first and second fixed forward torque ratios is 1.64, the step ratio between the second and third fixed forward torque ratios 1.83, and the step ratio between the third and fourth fixed forward torque ratios is 1.64.

Description of a Fourth Exemplary Embodiment

Figures 4A, 4B:
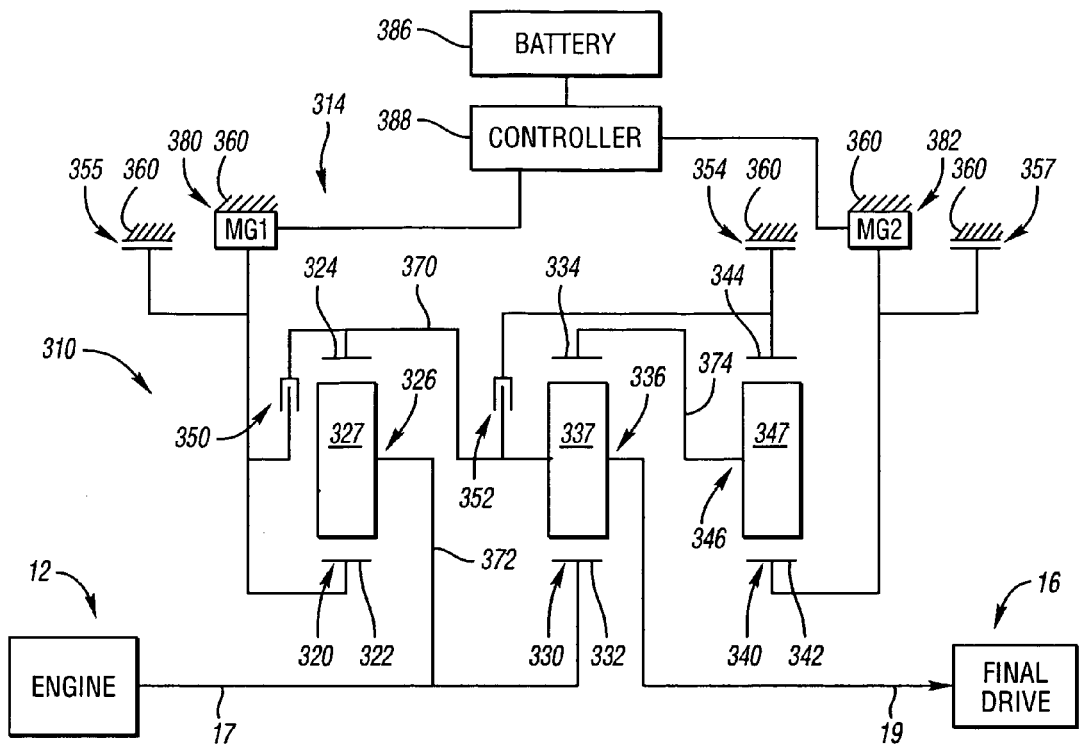

With reference to FIG. 4a, a powertrain 310 is shown, including an engine 12 connected to one preferred embodiment of the improved electrically variable transmission, designated generally by the numeral 314. The transmission 314 is designed to receive at least a portion of its driving power from the engine 12.

As shown, the engine 12 has an output shaft that serves as the input member 17 of the transmission 314. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 314. An output member 19 of the transmission 314 is connected to a final drive 16.

The transmission 314 utilizes three planetary gear sets 320, 330 and 340. The planetary gear set 320 employs an outer ring gear member 324 which circumscribes an inner sun gear member 322. A carrier 326 rotatably supports a plurality of planet gears 327 such that each planet gear 327 meshingly engages both the outer ring gear member 324 and the inner sun gear member 322 of the first planetary gear set 320.

The planetary gear set 330 also has an outer ring gear member 334 that circumscribes an inner sun gear member 332. A plurality of planet gears 337 are also rotatably mounted in a carrier 336 such that each planet gear member 337 simultaneously, and meshingly engages both the outer, ring gear member 334 and the inner, sun gear member 332 of the planetary gear set 330.

The planetary gear set 340 also has an outer ring gear member 344 that circumscribes an inner sun gear member 342. A plurality of planet gears 347 are also rotatably mounted in a carrier 346 such that each planet gear member 347 simultaneously, and meshingly, engages both the outer ring gear member 344 and the inner sun gear member 342 of the planetary gear set 340.

The transmission input member 17 is connected with the carrier 326 of the planetary gear set 320, and the transmission output member 19 is connected with the carrier 336 of the planetary gear set 330. A first interconnecting member 370 continuously connects the ring gear 324 of the planetary gear set 320 with the carrier 336 of the planetary gear set 330. A second interconnecting member 372 continuously connects the carrier 326 of the planetary gear set 320 with the sun gear 332 of the planetary gear set 330. A third interconnecting member 374 continuously connects the ring gear 334 of the planetary gear set 330 with the carrier 346 of the planetary gear set 340.

The transmission 314 also incorporates first and second motor/generators 380 and 382, respectively. The stator of the first motor/generator 380 is secured to the transmission housing 360. The rotor of the first motor/generator 380 is secured to the sun gear 322 of the planetary gear set 320. The stator of the second motor/generator 382 is also secured to the transmission housing 360. The rotor of the second motor/generator 382 is secured to the sun gear 342 of the planetary gear set 340.

A first torque-transfer device, such as the clutch 350, selectively connects the sun gear 322 with the ring gear 324. A second torque-transfer device, such as the clutch 352, selectively connects the carrier 336 with the ring gear 344. A third torque-transfer device, such as brake 354, selectively connects the ring gear 344 with the transmission housing 360. The first, second and third torque-transfer devices 350, 352 and 354 are employed to assist in the selection of the operational modes of the transmission 314.

The hybrid transmission 314 receives power from the engine 12, and also exchanges power with an electric power source 386, which is operably connected to a controller 388.

The operating mode table of FIG. 4b illustrates the clutching engagements, motor/generator conditions and output/input ratios for the five operating modes of the transmission 314. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3, F4) as described previously.

As set forth above, the engagement schedule for the torque-transfer devices is shown in the operating mode table and fixed ratio mode table of FIG. 4b. FIG. 4b also provides an example of torque ratios that are available utilizing the ring gear/sun gear tooth ratios given by way of example in FIG. 4b. The $N_{R1}/N_{S1}$ value is the tooth ratio of the planetary gear set 320; the $N_{R2}/N_{S2}$ value is the tooth ratio of the planetary gear set 330; and the $N_{R3}/N_{S3}$ value is the tooth ratio of the planetary gear set 340. Also, the chart of FIG. 4b describes the ratio steps that are attained utilizing the sample of tooth ratios given. For example, the step ratio between first and second fixed forward torque ratios is 2.06, the step ratio between the second and third fixed forward torque ratios is 1.56, and the step ratio between the third and fourth fixed forward torque ratios is 1.33. Each of the single step forward shifts between fixed ratios is a single transition shift.

Description of a Fifth Exemplary Embodiment

Figures 5A, 5B:
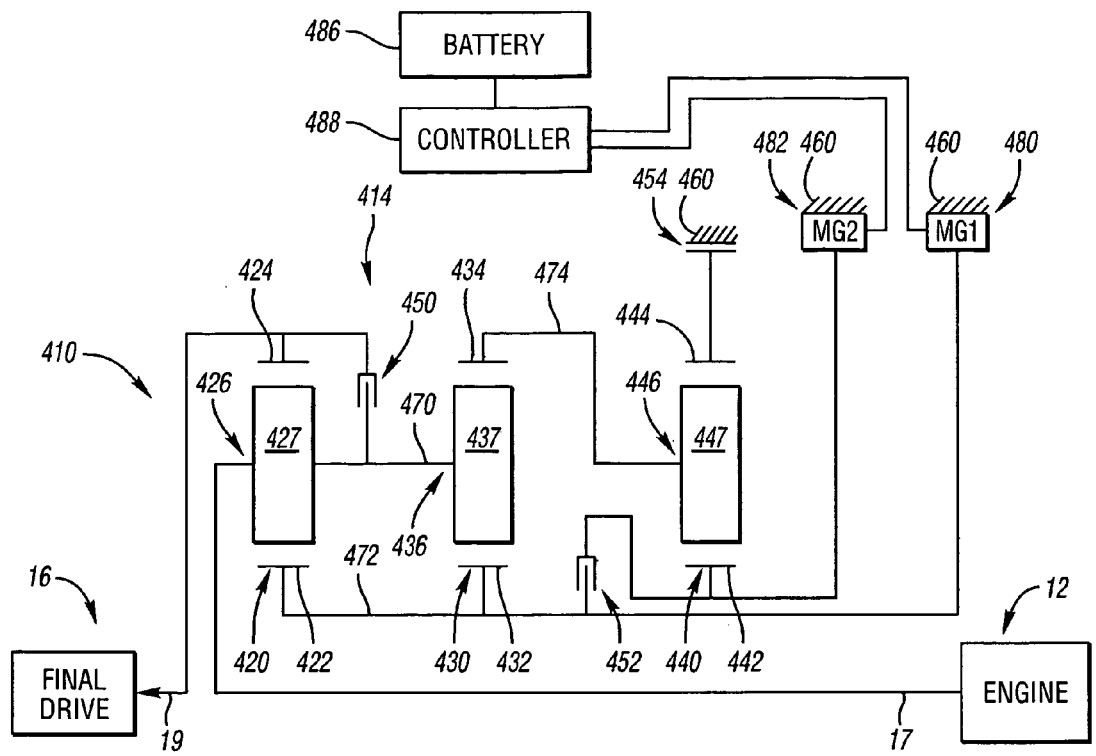

With reference to FIG. 5a, a powertrain 410 is shown, including an engine 12 connected to one preferred embodiment of the improved electrically variable transmission, designated generally by the numeral 414. The transmission 414 is designed to receive at least a portion of its driving power from the engine 12.

As shown, the engine 12 has an output shaft that serves as the input member 17 of the transmission 414. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 414. An output member 19 of the transmission 414 is connected to a final drive 16.

The transmission 414 utilizes three planetary gear sets 420, 430 and 440. The planetary gear set 420 employs an outer ring gear member 424 which circumscribes an inner sun gear member 422. A carrier 426 rotatably supports a plurality of planet gears 427 such that each planet gear 427 meshingly engages both the outer ring gear member 424 and the inner sun gear member 422 of the first planetary gear set 420.

The planetary gear set 430 also has an outer ring gear member 434 that circumscribes an inner sun gear member 432. A plurality of planet gears 437 are also rotatably mounted in a carrier 436 such that each planet gear member 437 simultaneously, and meshingly engages both the outer, ring gear member 434 and the inner, sun gear member 432 of the planetary gear set 430.

The planetary gear set 440 also has an outer ring gear member 444 that circumscribes an inner sun gear member 442. A plurality of planet gears 447 are also rotatably mounted in a carrier 446 such that each planet gear member 447 simultaneously, and meshingly, engages both the outer ring gear member 444 and the inner sun gear member 442 of the planetary gear set 440.

The transmission input member 17 is continuously connected with the carrier 426, and the transmission output member 19 is continuously connected with the ring gear 424. A first interconnecting member 470 continuously connects the carrier 426 with the carrier 436. A second interconnecting member 472 continuously connects the sun gear 422 with the sun gear 432. A third interconnecting member 474 continuously connects the ring gear 434 with the carrier 446.

The transmission 414 also incorporates first and second motor/generators 480 and 482, respectively. The stator of the first motor/generator 480 is secured to the transmission housing 460. The rotor of the first motor/generator 480 is secured to the sun gear 432.

The stator of the second motor/generator 482 is also secured to the transmission housing 460. The rotor of the second motor/generator 482 is secured to the sun gear 442.

A first torque-transfer device, such as a clutch 450, selectively connects the ring gear 424 with the carrier 426. A second torque-transfer device, such as clutch 452, selectively connects the sun gear 432 with the sun gear 442. A third torque-transfer device, such as brake 454, selectively connects the ring gear 444 with the transmission housing 460. The first, second and third torque-transfer devices 450, 452 and 454 are employed to assist in the selection of the operational modes of the transmission 414. The hybrid transmission 414 receives power from the engine 12 and also from an electric power source 486, which is operably connected to a controller 488.

The operating mode table of FIG. 5b illustrates the clutching engagements, motor/generator conditions and output/input ratios for the five operating modes of the transmission 414. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3, F4) as described previously.

The transmission 414 is a single mode transmission providing ratios between 4.69 and 0.54.

As set forth above, the engagement schedule for the torque-transfer devices is shown in the operating mode table and fixed ratio mode table of FIG. 5b. FIG. 5b also provides an example of torque ratios that are available utilizing the ring gear/sun gear tooth ratios given by way of example in FIG. 5b. The $N_{R1}/N_{S1}$ value is the tooth ratio of the planetary gear set 420; the $N_{R2}/N_{S2}$ value is the tooth ratio of the planetary gear set 430; and the $N_{R3}/N_{S3}$ value is the tooth ratio of the planetary gear set 440. Also, the chart of FIG. 5b describes the ratio steps that are attained utilizing the sample of tooth ratios given. For example, the step ratio between first and second fixed forward torque ratios is 2.27, the step ratio between the second and third fixed forward torque ratios is 1.54, and the step ratio between the third and fourth fixed forward torque ratios is 1.33. Each of the single step forward shifts between fixed ratios is a single transition shift.

Description of a Sixth Exemplary Embodiment

Figures 6A, 6B:
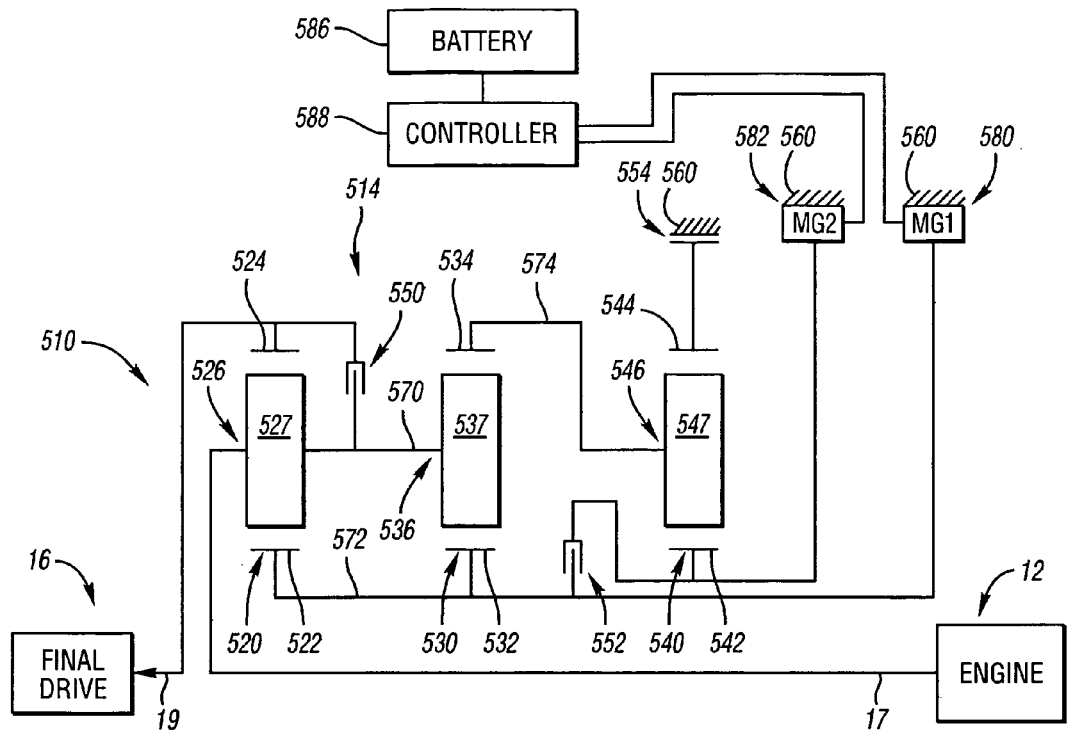

With reference to FIG. 6a, a powertrain 510 is shown, including an engine 12 connected to one preferred embodiment of the improved electrically variable transmission, designated generally by the numeral 514. The transmission 514 is designed to receive at least a portion of its driving power from the engine 12.

As shown, the engine 12 has an output shaft that serves as the input member 17 of the transmission 514. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 514. An output member 19 of the transmission 514 is connected to a final drive 16.

The transmission 514 utilizes three planetary gear sets 520, 530 and 540. The planetary gear set 520 employs an outer ring gear member 524 which circumscribes an inner sun gear member 522. A carrier 526 rotatably supports a plurality of planet gears 527 such that each planet gear 527 meshingly engages both the outer ring gear member 524 and the inner sun gear member 522 of the first planetary gear set 520.

The planetary gear set 530 also has an outer ring gear member 534 that circumscribes an inner sun gear member 532. A plurality of planet gears 537 are also rotatably mounted in a carrier 536 such that each planet gear member 537 simultaneously, and meshingly engages both the outer, ring gear member 534 and the inner, sun gear member 532 of the planetary gear set 530.

The planetary gear set 540 also has an outer ring gear member 544 that circumscribes an inner sun gear member 542. A plurality of planet gears 547 are also rotatably mounted in a carrier 546 such that each planet gear member 547 simultaneously, and meshingly, engages both the outer ring gear member 544 and the inner sun gear member 542 of the planetary gear set 540.

The transmission input member 17 is continuously connected with the carrier 526, and the transmission output member 19 is continuously connected with the ring gear member 524. The first interconnecting member 570 continuously connects the carrier 526 with the carrier 536. A second interconnecting member 572 continuously connects the sun gear 522 with the sun gear 532. A third interconnecting member 574 continuously connects the ring gear 534 with the carrier 546.

The transmission 514 also incorporates first and second motor/generators 580 and 582, respectively. The stator of the first motor/generator 580 is secured to the transmission housing 560. The rotor of the first motor/generator 580 is secured to the sun gear 532.

The stator of the second motor/generator 582 is also secured to the transmission housing 560. The rotor of the second motor/generator 582 is secured to the sun gear 542.

A first torque-transfer device, such as a clutch 550, selectively connects the ring gear 524 with the carrier 526. A second torque-transfer device, such as a clutch 552, selectively connects the sun gear 532 with the sun gear 542. A third torque-transfer device, such as a brake 554, selectively connects the ring gear 544 with the transmission housing 560. The first, second and third torque-transfer devices 550, 552 and 554 are employed to assist in the selection of the operational modes of the hybrid transmission 514.

The hybrid transmission 514 receives power from the engine 12, and also exchanges power with an electric power source 586, which is operably connected to a controller 588.

The operating mode table of FIG. 6b illustrates the clutching engagements, motor/generator conditions and output/input ratios for the five operating modes of the transmission 514. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3, F4) as described previously.

As set forth above, the engagement schedule for the torque-transfer devices is shown in the operating mode table and fixed ratio mode table of FIG. 6b. FIG. 6b also provides an example of torque ratios that are available utilizing the ring gear/sun gear tooth ratios given by way of example in FIG. 6b. The $N_{R1}/N_{S1}$ value is the tooth ratio of the planetary gear set 520; the $N_{R2}/N_{S2}$ value is the tooth ratio of the planetary gear set 530; and the $N_{R3}/N_{S3}$ value is the tooth ratio of the planetary gear set 540. Also, the chart of FIG. 4b describes the ratio steps that are attained utilizing the sample of tooth ratios given. For example, the step ratio between first and second fixed forward torque ratios is 2.27 the step ratio between the second and third fixed forward torque ratios is 1.54, and the step ratio between the third and fourth fixed forward torque ratios is 1.33. Each of the single step forward shifts between fixed ratios is a single transition shift.

Description of a Seventh Exemplary Embodiment

Figures 7A, 7B:
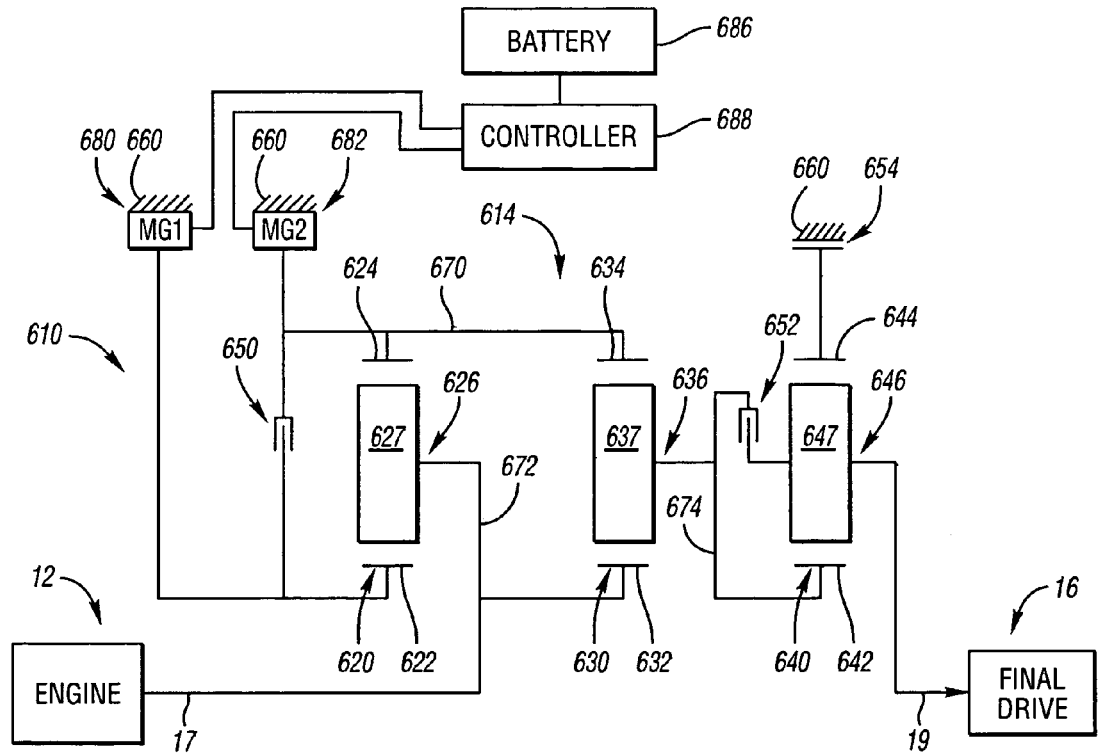

With reference to FIG. 7a, a powertrain 610 is shown, including an engine 12 connected to one preferred embodiment of the improved electrically variable transmission, designated generally by the numeral 614. The transmission 614 is designed to receive at least a portion of its driving power from the engine 12.

As shown, the engine 12 has an output shaft that serves as the input member 17 of the transmission 614. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 614. An output member 19 of the transmission 614 is connected to a final drive 16.

The transmission 614 utilizes three planetary gear sets 620, 630 and 640. The planetary gear set 620 employs an outer ring gear member 624 which circumscribes an inner sun gear member 622. A carrier 626 rotatably supports a plurality of planet gears 627 such that each planet gear 627 meshingly engages both the outer ring gear member 624 and the inner sun gear member 622 of the first planetary gear set 620.

The planetary gear set 630 also has an outer ring gear member 634 that circumscribes an inner sun gear member 632. A plurality of planet gears 637 are also rotatably mounted in a carrier 636 such that each planet gear member 637 simultaneously, and meshingly engages both the outer, ring gear member 634 and the inner, sun gear member 632 of the planetary gear set 630.

The planetary gear set 640 also has an outer ring gear member 644 that circumscribes an inner sun gear member 642. A plurality of planet gears 647 are also rotatably mounted in a carrier 646 such that each planet gear member 647 simultaneously, and meshingly, engages both the outer ring gear member 644 and the inner sun gear member 642 of the planetary gear set 640.

The transmission input member 17 is continuously connected with the carrier 626, and the transmission output member 19 is continuously connected with the carrier 646. A first interconnecting member 670 continuously connects the ring gear 624 with the ring gear 634. A second interconnecting member 672 continuously connects the carrier 626 with the sun gear 632. A third interconnecting member 674 continuously connects the carrier 636 with the sun gear 642.

The transmission 614 also incorporates first and second motor/generators 680 and 682, respectively. The stator of the first motor/generator 680 is secured to the transmission housing 660. The rotor of the first motor/generator 680 is secured to the sun gear 622.

The stator of the second motor/generator 682 is also secured with the transmission housing 660. The rotor of the second motor/generator 682 is secured to the ring gear 624.

A first torque-transfer device, such as a clutch 650, selectively connects the ring gear 624 with the sun gear 622. A second torque-transfer device, such as a clutch 652, selectively connects the carrier 646 with the sun gear 642. A third torque-transfer device, such as a brake 654, selectively connects the ring gear 644 with the transmission housing 660. The first, second and third torque-transfer devices 650, 652 and 654 are employed to assist in the selection of the operational modes of the hybrid transmission 614.

The hybrid transmission 614 receives power from the engine 12, and also exchanges power with an electric power source 686, which is operably connected to a controller 688.

The operating mode table of FIG. 7b illustrates the clutching engagements, motor/generator conditions and output/input ratios for the five operating modes of the transmission 614. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3, F4) as described previously.

As set forth above, the engagement schedule for the torque-transfer devices is shown in the operating mode table and fixed ratio mode table of FIG. 7b. FIG. 7b also provides an example of torque ratios that are available utilizing the ring gear/sun gear tooth ratios given by way of example in FIG. 7b. The $N_{R1}/N_{S1}$ value is the tooth ratio of the planetary gear set 620; the $N_{R2}/N_{S2}$ value is the tooth ratio of the planetary gear set 630; and the $N_{R3}/N_{S3}$ value is the tooth ratio of the planetary gear set 640. Also, the chart of FIG. 7b describes the ratio steps that are attained utilizing the sample of tooth ratios given. For example, the step ratio between first and second fixed forward torque ratios is 2.09, the step ratio between the second and third fixed forward torque ratios is 1.91, and the step ratio between the third and fourth fixed forward torque ratios is 1.33.

Description of an Eighth Exemplary Embodiment

Figures 8A, 8B:
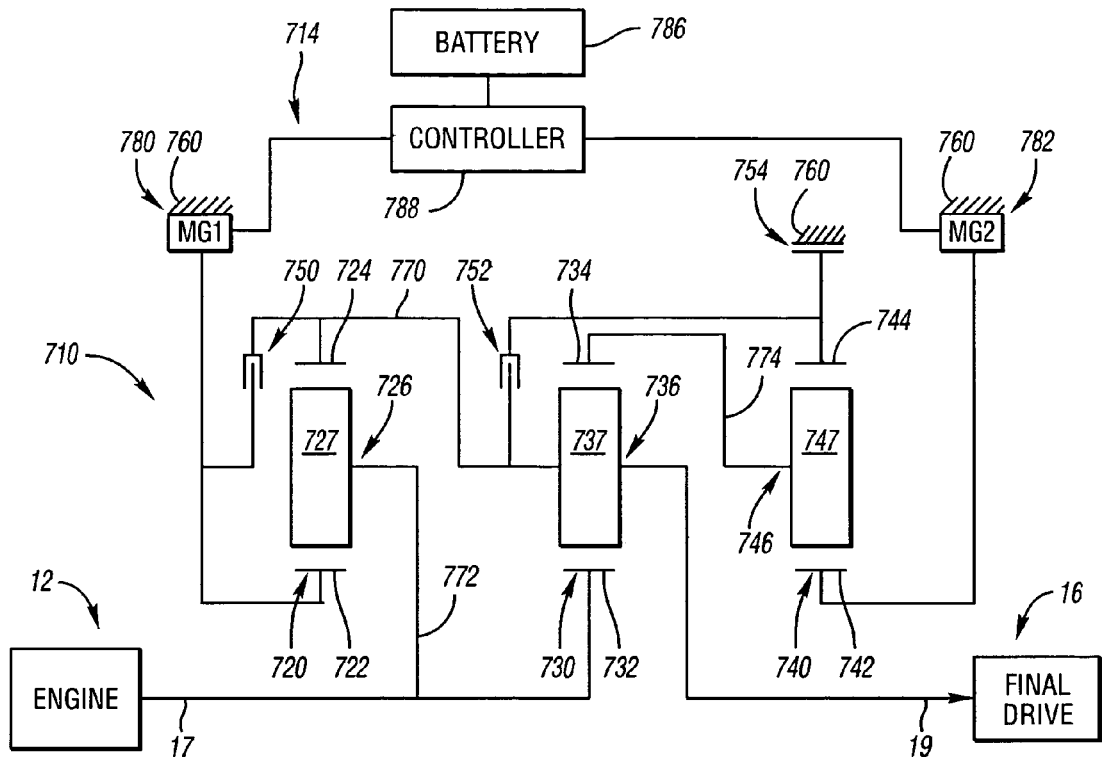

With reference to FIG. 8a, a powertrain 710 is shown, including an engine 12 connected to one preferred embodiment of the improved electrically variable transmission, designated generally by the numeral 714. The transmission 714 is designed to receive at least a portion of its driving power from the engine 12.

As shown, the engine 12 has an output shaft that serves as the input member 17 of the transmission 714. A transient torque damper (not shown) may also be appointed between the engine 12 and the input member 17 of the transmission.

Irrespective of the means by which the engine 12 is connected to the transmission input member 17, the transmission input member 17 is operatively connected to a planetary gear set in the transmission 714. An output member 19 of the transmission 714 is connected to a final drive 16.

The transmission 714 utilizes three planetary gear sets 720, 730 and 740. The planetary gear set 720 employs an outer ring gear member 724 which circumscribes an inner sun gear member 722. A carrier 726 rotatably supports a plurality of planet gears 727 such that each planet gear 727 meshingly engages both the outer ring gear member 724 and the inner sun gear member 722 of the first planetary gear set 720.

The planetary gear set 730 also has an outer ring gear member 734 that circumscribes an inner sun gear member 732. A plurality of planet gears 737 are also rotatably mounted in a carrier 736 such that each planet gear member 737 simultaneously, and meshingly engages both the outer, ring gear member 734 and the inner, sun gear member 732 of the planetary gear set 730.

The planetary gear set 740 also has an outer ring gear member 744 that circumscribes an inner sun gear member 742. A plurality of planet gears 747 are also rotatably mounted in a carrier 746 such that each planet gear member 747 simultaneously, and meshingly, engages both the outer ring gear member 744 and the inner sun gear member 742 of the planetary gear set 740.

The transmission input member 17 is continuously connected with the carrier 726, and the transmission output member 19 is continuously connected with the carrier 736. A first interconnecting member 770 continuously connects the ring gear 724 with the carrier 736. A second interconnecting member 772 continuously connects the carrier 726 with the sun gear 732. A third interconnecting member 774 continuously connects the ring gear 734 with the carrier 746.

The transmission 714 also incorporates first and second motor/generators 780 and 782, respectively. The stator of the first motor/generator 780 is secured to the transmission housing 760. The rotor of the first motor/generator 780 is secured to the sun gear 722.

The stator of the second motor/generator 782 is also secured to the transmission housing 760. The rotor of the second motor/generator 782 is secured to the sun gear 742.

A first torque-transfer device, such as a clutch 750, selectively connects the ring gear 724 with the sun gear 722. A second torque-transfer device, such as a clutch 752, selectively connects the carrier 736 with the ring gear 744. A third torque-transfer device, such as the brake 754, selectively connects the ring gear 744 with the transmission housing 760. The first, second and third torque-transfer devices 750, 752 and 754 are employed to assist in the selection of the operational modes of the hybrid transmission 714.

The hybrid transmission 714 receives power from the engine 12, and also exchanges power with an electric power source 786, which is operably connected to a controller 788.

The operating mode table of FIG. 8b illustrates the clutching engagements, motor/generator conditions and output/input ratios for the five operating modes of the transmission 714. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3, F4) as described previously.

As set forth above, the engagement schedule for the torque-transfer devices is shown in the operating mode table and fixed ratio mode table of FIG. 8b. FIG. 8b also provides an example of torque ratios that are available utilizing the ring gear/sun gear tooth ratios given by way of example in FIG. 8b. The $N_{R1}/N_{S1}$ value is the tooth ratio of the planetary gear set 720; the $N_{R2}/N_{S2}$ value is the tooth ratio of the planetary gear set 730; and the $N_{R3}/N_{S3}$ value is the tooth ratio of the planetary gear set 740. Also, the chart of FIG. 8b describes the ratio steps that are attained utilizing the sample of tooth ratios given. For example, the step ratio between first and second fixed forward torque ratios is 2.06, the step ratio between the second and third fixed forward torque ratios is 1.56, and the step ratio between the third and fourth fixed forward torque ratios is 1.33. Each of the single step forward shifts between fixed ratios is a single transition shift.

Description of a Ninth Exemplary Embodiment

Figures 9A, 9B:
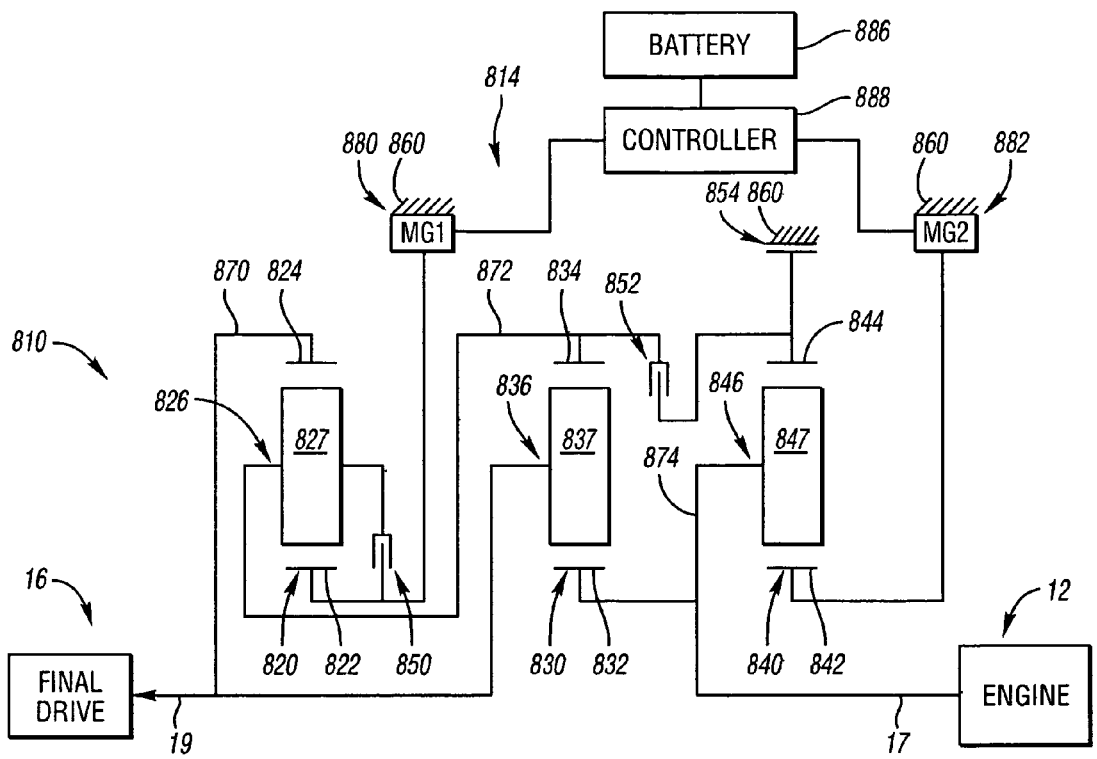

With reference to FIG. 9a, a powertrain 810 is shown, including an engine 12 connected to one preferred embodiment of the improved electrically variable transmission, designated generally by the numeral 814. The transmission 814 is designed to receive at least a portion of its driving power from the engine 12.

As shown, the engine 12 has an output shaft that serves as the input member 17 of the transmission 814. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 814. An output member 19 of the transmission 814 is connected to a final drive 16.

The transmission 814 utilizes three planetary gear sets 820, 830 and 840. The planetary gear set 820 employs an outer ring gear member 824 which circumscribes an inner sun gear member 822. A carrier 826 rotatably supports a plurality of planet gears 827 such that each planet gear 827 meshingly engages both the outer ring gear member 824 and the inner sun gear member 822 of the first planetary gear set 820.

The planetary gear set 830 also has an outer ring gear member 834 that circumscribes an inner sun gear member 832. A plurality of planet gears 837 are also rotatably mounted in a carrier 836 such that each planet gear member 837 simultaneously, and meshingly engages both the outer, ring gear member 834 and the inner, sun gear member 832 of the planetary gear set 830.

The planetary gear set 840 also has an outer ring gear member 844 that circumscribes an inner sun gear member 842. A plurality of planet gears 847 are also rotatably mounted in a carrier 846 such that each planet gear member 847 simultaneously, and meshingly, engages both the outer ring gear member 844 and the inner sun gear member 842 of the planetary gear set 840.

The transmission input member 17 is continuously connected with the carrier 846, and the transmission output member 19 is continuously connected with the ring gear 824. A first interconnecting member 870 continuously connects the ring gear 824 with the carrier 836. A second interconnecting member 872 continuously connects the carrier 826 with the ring gear 834. A third interconnecting member 874 continuously connects the sun gear 832 with the carrier 846.

The transmission 814 also incorporates first and second motor/generators 880 and 882, respectively. The stator of the first motor/generator 880 is secured to the transmission housing 860. The rotor of the first motor/generator 880 is secured to the sun gar 822.

The stator of the second motor/generator 882 is also secured to the transmission housing 860. The rotor of the second motor/generator 882 is secured to the sun gear 842.

A first torque-transfer device, such as a clutch 850, selectively connects the carrier 826 with the sun gear 822. A second torque-transfer device, such as clutch 852, selectively connects the ring gear 834 with the ring gear 844. A third torque-transfer device, such as brake 854, selectively connects the ring gear 844 with the transmission housing 860. The first, second and third torque-transfer devices 850, 852 and 854 are employed to assist in the selection of the operational modes of the hybrid transmission 814.

The hybrid transmission 814 receives power from the engine 12, and exchanges power with an electric power source 886, which is operably connected to a controller 888.

The operating mode table of FIG. 9b illustrates the clutching engagements, motor/generator conditions and output/input ratios for the five operating modes of the transmission 814. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3, F4) as described previously.

As set forth above, the engagement schedule for the torque-transfer devices is shown in the operating mode table and fixed ratio mode table of FIG. 9b. FIG. 9b also provides an example of torque ratios that are available utilizing the ring gear/sun gear tooth ratios given by way of example in FIG. 9b. The $N_{R1}/N_{S1}$ value is the tooth ratio of the planetary gear set 820; the $N_{R2}/N_{S2}$ value is the tooth ratio of the planetary gear set 830; and the $N_{R3}/N_{S3}$ value is the tooth ratio of the planetary gear set 840. Also, the chart of FIG. 9b describes the ratio steps that are attained utilizing the sample of tooth ratios given. For example, the step ratio between first and second fixed forward torque ratios is 2.20, the step ratio between the second and third fixed forward torque ratios is 1.66, and the step ratio between the third and fourth fixed forward torque ratios is 1.23. Each of the single step forward shifts between fixed ratios is a single transition shift.

Description of a Tenth Exemplary Embodiment

Figures 10A, 10B:
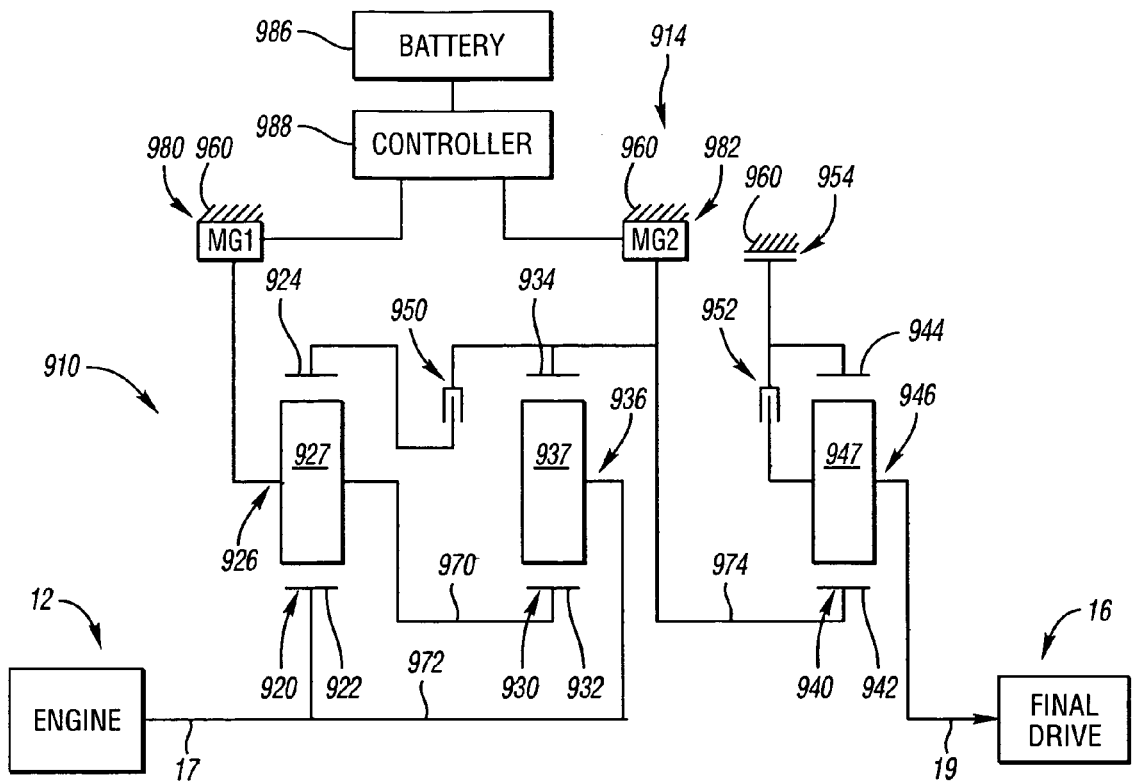

With reference to FIG. 10a, a powertrain 910 is shown, including an engine 12 connected to one preferred embodiment of the improved electrically variable transmission, designated generally by the numeral 914. The transmission 914 is designed to receive at least a portion of its driving power from the engine 12.

As shown, the engine 12 has an output shaft that serves as the input member 17 of the transmission 914. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 914. An output member 19 of the transmission 914 is connected to a final drive 16.

The transmission 914 utilizes three planetary gear sets 920, 930 and 940. The planetary gear set 920 employs an outer ring gear member 924 which circumscribes an inner sun gear member 922. A carrier 926 rotatably supports a plurality of planet gears 927 such that each planet gear 927 meshingly engages both the outer ring gear member 924 and the inner sun gear member 922 of the first planetary gear set 920.

The planetary gear set 930 also has an outer ring gear member 934 that circumscribes an inner sun gear member 932. A plurality of planet gears 937 are also rotatably mounted in a carrier 936 such that each planet gear member 937 simultaneously, and meshingly engages both the outer ring gear member 934 and the inner, sun gear member 932 of the planetary gear set 930.

The planetary gear set 940 also has an outer ring gear member 944 that circumscribes an inner sun gear member 942. A plurality of planet gears 947 are also rotatably mounted in a carrier 946 such that each planet gear member 947 simultaneously, and meshingly, engages both the outer ring gear member 944 and the inner sun gear member 942 of the planetary gear set 940.

The transmission input member 17 is continuously connected with the sun gear 922. The transmission output member 19 is continuously connected with the carrier 946. A first interconnecting member 970 continuously connects the carrier 926 with the sun gear 932. A second interconnecting member 972 continuously connects the sun gear 922 with the carrier 936. A third interconnecting member 974 continuously connects the ring gear 934 with the sun gear 942.

A first torque-transfer device, such as a clutch 950, selectively connects the ring gear 924 with the ring gear 934. A second torque-transfer device, such as a clutch 952, selectively connects the ring gear 944 with the carrier 946. A third torque-transfer device, such as brake 954, selectively connects the ring gear 944 with the transmission housing 960. The first, second and third torque-transfer devices 950, 952 and 954 are employed to assist in the selection of the operational modes of the hybrid transmission 914.

The hybrid transmission 914 receives power from the engine 12, and also exchanges power with an electric power source 986, which is operably connected to a controller 988.

The operating mode table of FIG. 10b illustrates the clutching engagements, motor/generator conditions and output/input ratios for the five operating modes of the transmission 914. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3, F4) as described previously.

As set forth above, the engagement schedule for the torque-transfer devices is shown in the operating mode table and fixed ratio mode table of FIG. 10b. FIG. 10b also provides an example of torque ratios that are available utilizing the ring gear/sun gear tooth ratios given by way of example in FIG. 10b. The $N_{R1}/N_{S1}$ value is the tooth ratio of the planetary gear set 920; the $N_{R2}/N_{S2}$ value is the tooth ratio of the planetary gear set 930; and the $N_{R3}/N_{S3}$ value is the tooth ratio of the planetary gear set 940. Also, the chart of FIG. 10b describes the ratio steps that are attained utilizing the sample of tooth ratios given. For example, the step ratio between first and second fixed forward torque ratios is 1.60, the step ratio between the second and third fixed forward torque ratios is 1.87, and the step ratio between the third and fourth fixed forward torque ratios is 1.61.

Description of an Eleventh Exemplary Embodiment

Figures 11A, 11B:
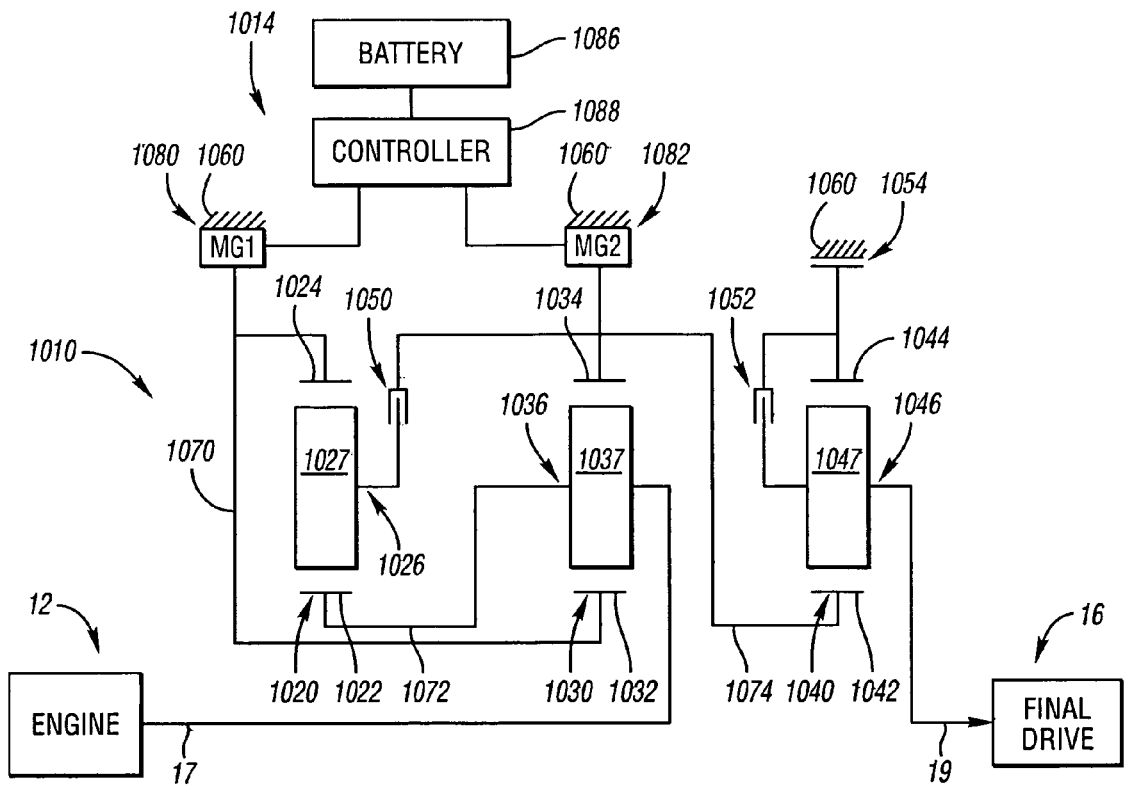

With reference to FIG. 11a, a powertrain 1010 is shown, including an engine 12 connected to one preferred embodiment of the improved electrically variable transmission, designated generally by the numeral 1014. The transmission 1014 is designed to receive at least a portion of its driving power from the engine 12.

As shown, the engine 12 has an output shaft that serves as the input member 17 of the transmission 1014. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 1014. An output member 19 of the transmission 1014 is connected to a final drive 16.

The transmission 1014 utilizes three planetary gear sets 1020, 1030 and 1040. The planetary gear set 1020 employs an outer ring gear member 1024 which circumscribes an inner sun gear member 1022. A carrier 1026 rotatably supports a plurality of planet gears 1027 such that each planet gear 1027 meshingly engages both the outer ring gear member 1024 and the inner sun gear member 1022 of the first planetary gear set 1020.

The planetary gear set 1030 also has an outer ring gear member 1034 that circumscribes an inner sun gear member 1032. A plurality of planet gears 1037 are also rotatably mounted in a carrier 1036 such that each planet gear member 1037 simultaneously, and meshingly engages both the outer, ring gear member 1034 and the inner, sun gear member 1032 of the planetary gear set 1030.

The planetary gear set 1040 also has an outer ring gear member 1044 that circumscribes an inner sun gear member 1042. A plurality of planet gears 1047 are also rotatably mounted in a carrier 1046 such that each planet gear member 1047 simultaneously, and meshingly, engages both the outer ring gear member 1044 and the inner sun gear member 1042 of the planetary gear set 1040.

The transmission input member 17 is continuously connected with the carrier 1036, and the transmission output member 19 is continuously connected with the carrier 1046. A first interconnecting member 1070 continuously connects the ring gear 1024 with the sun gear 1032. A second interconnecting member 1072 continuously connects the sun gear 1022 with the carrier 1036. A third interconnecting member 1074 continuously connects the ring gear 1034 with the sun gear 1042.

The transmission 1014 also incorporates first and second motor/generators 1080 and 1082, respectively. The stator of the first motor/generator 1080 is secured to the transmission housing 1060. The rotor of the first motor/generator 1080 is secured to the ring gear 1024.

The stator of the second motor/generator 1082 is also secured to the transmission housing 1060. The rotor of the second motor/generator 1082 is secured to the ring gear 1034.

A first torque-transfer device, such as a clutch 1050, selectively connects the carrier 1026 with the ring gear 1034. A second torque-transfer device, such as a clutch 1052, selectively connects the carrier 1046 with the ring gear 1044. A third torque-transfer device, such as brake 1054, selectively connects the ring gear 1044 with the transmission housing 1060. The first, second and third torque-transfer devices 1050, 1052 and 1054 are employed to assist in the selection of the operational modes of the hybrid transmission 1014.

The hybrid transmission 1014 receives power from the engine 12, and also exchanges power with the electric power source 1086, which is operably connected to a controller 1088.

The operating mode table of FIG. 11b illustrates the clutching engagements, motor/generator conditions and output/input ratios for the five operating modes of the transmission 1014. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3, F4) as described previously.

As set forth above, the engagement schedule for the torque-transfer devices is shown in the operating mode table and fixed ratio mode table of FIG. 11b. FIG. 11b also provides an example of torque ratios that are available utilizing the ring gear/sun gear tooth ratios given by way of example in FIG. 11b. The $N_{R1}/N_{S1}$ value is the tooth ratio of the planetary gear set 1020; the $N_{R2}/N_{S2}$ value is the tooth ratio of the planetary gear set 1030; and the $N_{R3}/N_{S3}$ value is the tooth ratio of the planetary gear set 1040. Also, the chart of FIG. 11b describes the ratio steps that are attained utilizing the sample of tooth ratios given. For example, the step ratio between first and second fixed forward torque ratios is 1.60, the step ratio between the second and third fixed forward torque ratios is 1.87, and the step ratio between the third and fourth fixed forward torque ratios is 1.61.

Description of a Twelfth Exemplary Embodiment

Figures 12A, 12B:
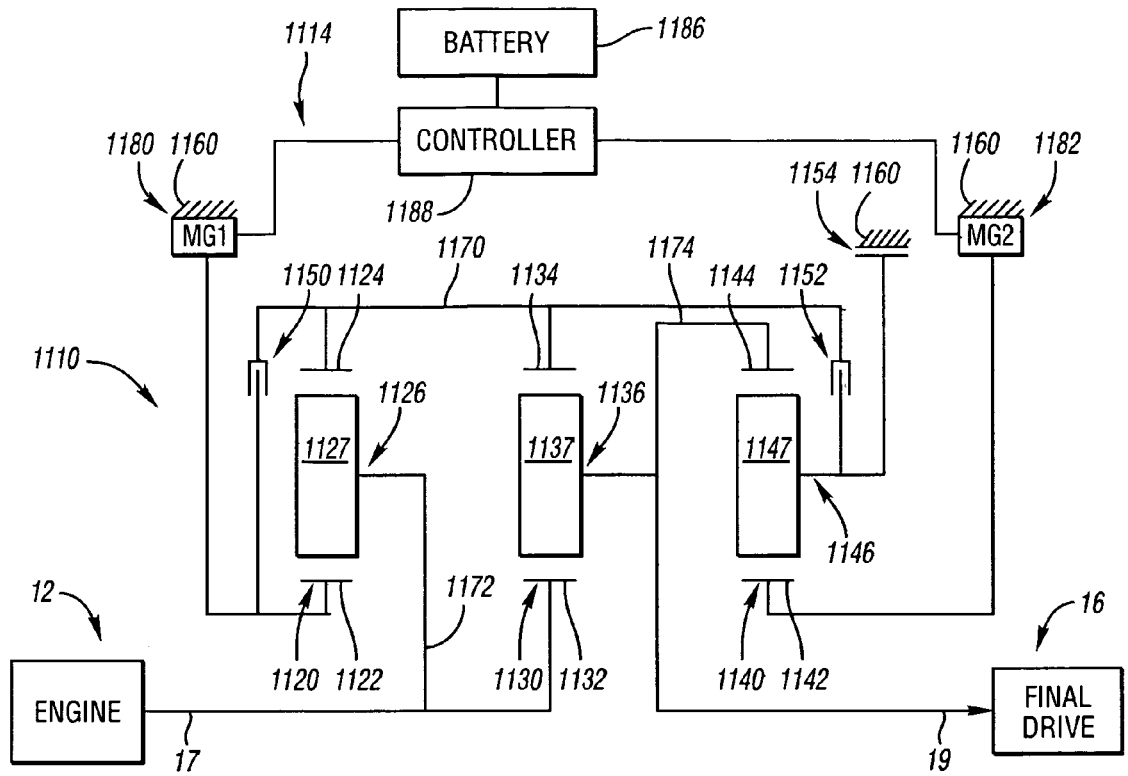

With reference to FIG. 12a, a powertrain 1110 is shown, including an engine 12 connected to one preferred embodiment of the improved electrically variable transmission, designated generally by the numeral 1114. The transmission 1114 is designed to receive at least a portion of its driving power from the engine 12.

As shown, the engine 12 has an output shaft that serves as the input member 17 of the transmission 1114. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 1114. An output member 19 of the transmission 1114 is connected to a final drive 16.

The transmission 1114 utilizes three planetary gear sets 1120, 1130 and 1140. The planetary gear set 1120 employs an outer ring gear member 1124 which circumscribes an inner sun gear member 1122. A carrier 1126 rotatably supports a plurality of planet gears 1127 such that each planet gear 1127 meshingly engages both the outer ring gear member 1124 and the inner sun gear member 1122 of the first planetary gear set 1120.

The planetary gear set 1130 also has an outer ring gear member 1134 that circumscribes an inner sun gear member 1132. A plurality of planet gears 1137 are also rotatably mounted in a carrier 1136 such that each planet gear member 1137 simultaneously, and meshingly engages both the outer, ring gear member 1134 and the inner, sun gear member 1132 of the planetary gear set 1130.

The planetary gear set 1140 also has an outer ring gear member 1144 that circumscribes an inner sun gear member 1142. A plurality of planet gears 1147 are also rotatably mounted in a carrier 1146 such that each planet gear member 1147 simultaneously, and meshingly engages both the outer ring gear member 1144 and the inner sun gear member 1142 of the planetary gear set 1140.

The transmission input member 17 is continuously connected with the carrier 1126, and the transmission output member 19 is continuously connected with the ring gear 1144. The first interconnecting member 1170 continuously connects the ring gear 1124 with the ring gear 1134. A second interconnecting member 1172 continuously connects the carrier 1126 with the sun gear 1132. A third interconnecting member 1174 continuously connects the carrier 1136 with the ring gear 1144.

The transmission 1114 also incorporates first and second motor/generators 1180 and 1182, respectively. The stator of the first motor/generator 1180 is secured to the transmission housing 1160. The rotor of the first motor/generator 1180 is secured to the sun gear 1122.

The stator of the second motor/generator 1182 is also secured to the transmission housing 1160. The rotor of the second motor/generator 1182 is secured to the sun gear 1142.

A first torque-transfer device, such as a clutch 1150, selectively connects the ring gear 1124 with the sun gear 1122. A second torque-transfer device, such as clutch 1152, selectively connects the ring gear 1134 with the carrier 1146. A third torque-transfer device, such as the brake 1154, selectively connects the carrier 1146 with the transmission housing 1160. The first, second and third torque-transfer devices 1150, 1152 and 1154 are employed to assist in the selection of the operational modes of the transmission 1114.

The hybrid transmission 1114 receives power from the engine 12, and also exchanges power with the electric power source 1186, which is operably connected to a controller 1188.

The operating mode table of FIG. 12b illustrates the clutching engagements, motor/generator conditions and output/input ratios for the five operating modes of the transmission 1114. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3, F4) as described previously.

As set forth above, the engagement schedule for the torque-transfer devices is shown in the operating mode table and fixed ratio mode table of FIG. 12b. FIG. 12b also provides an example of torque ratios that are available utilizing the ring gear/sun gear tooth ratios given by way of example in FIG. 12b. The $N_{R1}/N_{S1}$ value is the tooth ratio of the planetary gear set 1120; the $N_{R2}/N_{S2}$ value is the tooth ratio of the planetary gear set 1030; and the $N_{R3}/N_{S3}$ value is the tooth ratio of the planetary gear set 1140. Also, the chart of FIG. 12b describes the ratio steps that are attained utilizing the sample of tooth ratios given. For example, the step ratio between first and second fixed forward torque ratios is 2.13, the step ratio between the second and third fixed forward torque ratios is 1.64, and the step ratio between the third and fourth fixed forward torque ratios is 1.27. Each of the single step forward shifts between fixed ratios is a single transition shift.

Description of a Thirteenth Exemplary Embodiment

Figures 13A, 13B:
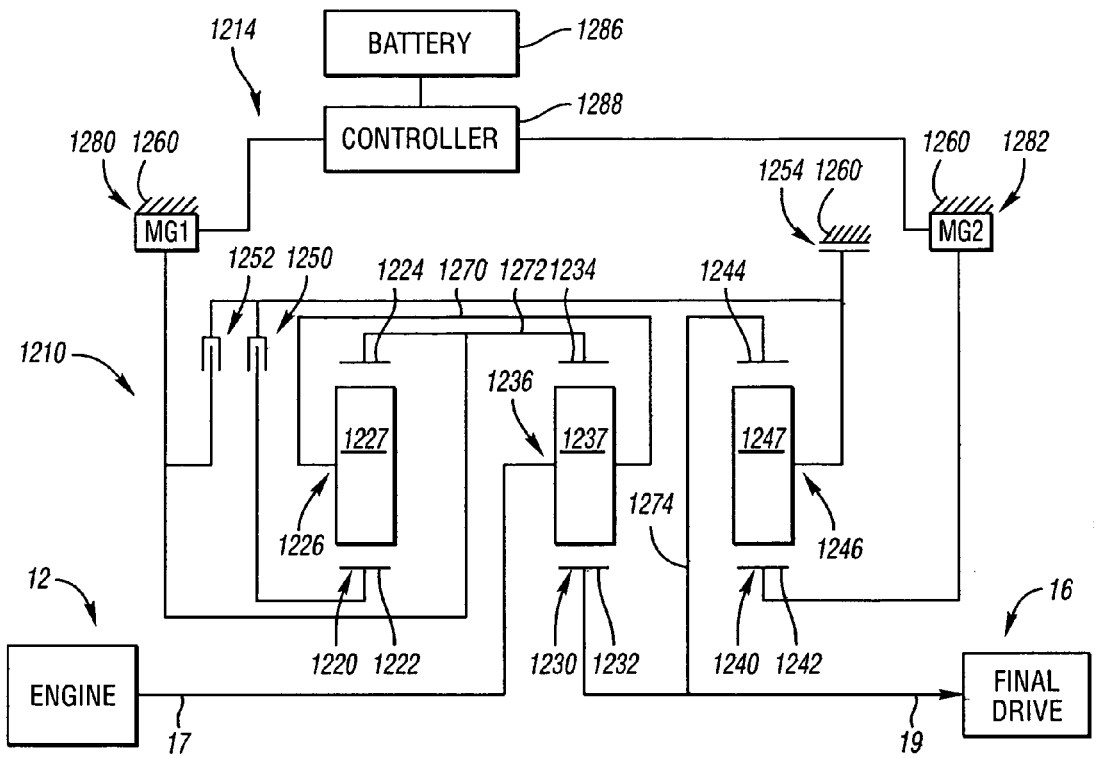

With reference to FIG. 13a, a powertrain 1210 is shown, including an engine 12 connected to one preferred embodiment of the improved electrically variable transmission, designated generally by the numeral 1214. The transmission 1214 is designed to receive at least a portion of its driving power from the engine 12.

As shown, the engine 12 has an output shaft that serves as the input member 17 of the transmission 1214. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 1214. An output member 19 of the transmission 1214 is connected to a final drive 16.

The transmission 1214 utilizes three planetary gear sets 1220, 1230 and 1240. The planetary gear set 1220 employs an outer ring gear member 1224 which circumscribes an inner sun gear member 1222. A carrier 1226 rotatably supports a plurality of planet gears 1227 such that each planet gear 1227 meshingly engages both the outer ring gear member 1224 and the inner sun gear member 1222 of the first planetary gear set 1220.

The planetary gear set 1230 also has an outer ring gear member 1234 that circumscribes an inner sun gear member 1232. A plurality of planet gears 1237 are also rotatably mounted in a carrier 1236 such that each planet gear member 1237 simultaneously, and meshingly engages both the outer, ring gear member 1234 and the inner, sun gear member 1232 of the planetary gear set 1230.

The planetary gear set 1240 also has an outer ring gear member 1244 that circumscribes an inner sun gear member 1242. A plurality of planet gears 1247 are also rotatably mounted in a carrier 1246 such that each planet gear member 1247 simultaneously, and meshingly, engages both the outer ring gear member 1244 and the inner sun gear member 1242 of the planetary gear set 1240.

The transmission input member 17 is continuously connected with the carrier 1236, and the transmission output member 19 is continuously connected with the ring gear 1244. A first interconnecting member 1270 continuously connects the carrier 1226 with the carrier 1236. A second interconnecting member 1272 continuously connects the ring gear 1224 with the ring gear 1234. A third interconnecting member 1274 continuously connects the sun gear 1232 with the ring gear 1244.

The transmission 1214 also incorporates first and second motor/generators 1280 and 1282, respectively. The stator of the first motor/generator 1280 is secured to the transmission housing 1260. The rotor of the first motor/generator 1280 is secured to the ring gear 1224. The stator of the second motor/generator 1282 is also secured to the transmission housing 1260. The rotor of the second motor/generator 1282 is secured to the sun gear 1242.

A first torque-transfer device, such as a clutch 1250, selectively connects the sun gear 1222 with the carrier 1246. A second torque-transfer device, such as clutch 1252, selectively connects the ring gear 1224 with the carrier 1246. A third torque-transfer device, such brake 1254, selectively connects the carrier 1246 with the transmission housing 1260. The first, second and third torque-transfer devices 1250, 1252 and 1254 are employed to assist in the selection of the operational modes of the hybrid transmission 1214.

The hybrid transmission 1214 receives power from the engine 12, and also exchanges power with an electric power source 1286, which is operably connected to a controller 1288.

The operating mode table of FIG. 13b illustrates the clutching engagements, motor/generator conditions and output/input ratios for the five operating modes of the transmission 1214. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3, F4) as described previously.

As set forth above, the engagement schedule for the torque-transfer devices is shown in the operating mode table and fixed ratio mode table of FIG. 13b. FIG. 13b also provides an example of torque ratios that are available utilizing the ring gear/sun gear tooth ratios given by way of example in FIG. 13b. The $N_{R1}/N_{S1}$ value is the tooth ratio of the planetary gear set 1220; the $N_{R2}/N_{S2}$ value is the tooth ratio of the planetary gear set 1230; and the $N_{R3}/N_{S3}$ value is the tooth ratio of the planetary gear set 1240. Also, the chart of FIG. 13b describes the ratio steps that are attained utilizing the sample of tooth ratios given. For example, the step ratio between first and second fixed forward torque ratios is 2.07, the step ratio between the second and third fixed forward torque ratios is 1.59, and the step ratio between the third and fourth fixed forward torque ratios is 1.20.

Description of a Fourteenth Exemplary Embodiment

Figures 14A, 14B:
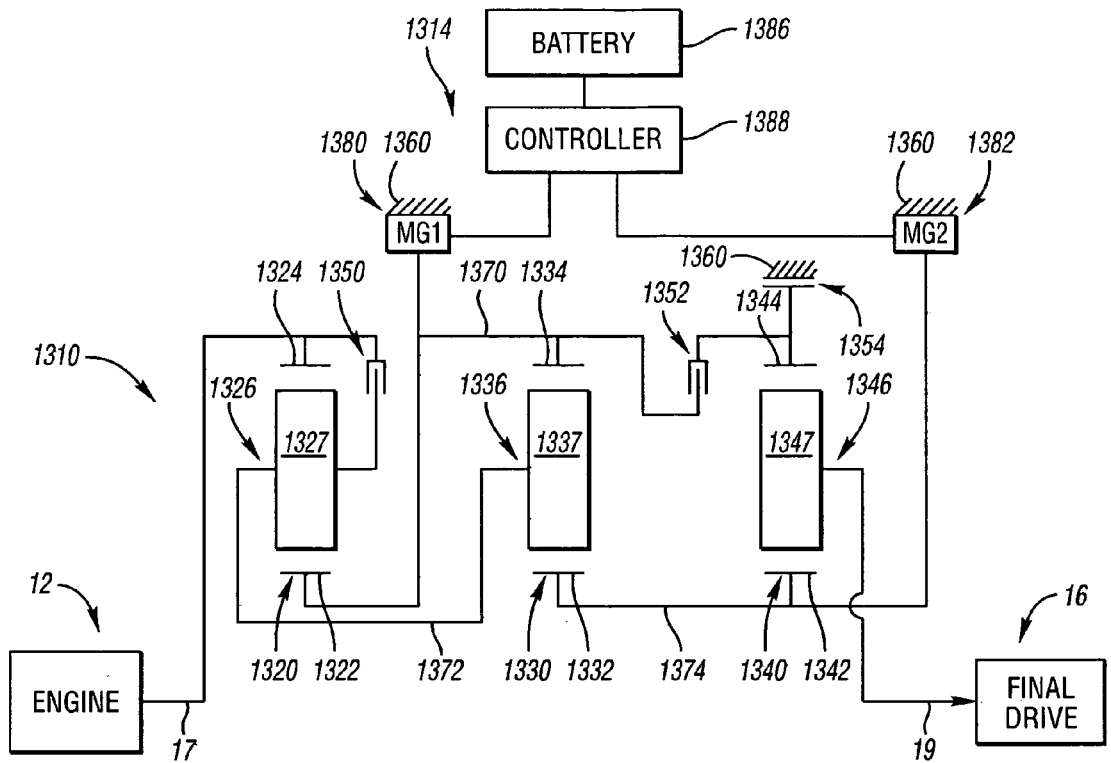

With reference to FIG. 14a, a powertrain 1310 is shown, including an engine 12 connected to one preferred embodiment of the improved electrically variable transmission, designated generally by the numeral 1314. The transmission 1314 is designed to receive at least a portion of its driving power from the engine 12.

As shown, the engine 12 has an output shaft that serves as the input member 17 of the transmission 1314. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 1314. An output member 19 of the transmission 1314 is connected to a final drive 16.

The transmission 1314 utilizes three planetary gear sets 1320, 1330 and 1340. The planetary gear set 1320 employs an outer ring gear member 1324 which circumscribes an inner sun gear member 1322. A carrier 1326 rotatably supports a plurality of planet gears 1327 such that each planet gear 1327 meshingly engages both the outer ring gear member 1324 and the inner sun gear member 1322 of the first planetary gear set 1320.

The planetary gear set 1330 also has an outer ring gear member 1334 that circumscribes an inner sun gear member 1332. A plurality of planet gears 1337 are also rotatably mounted in a carrier 1336 such that each planet gear member 1337 simultaneously, and meshingly engages both the outer, ring gear member 1334 and the inner, sun gear member 1332 of the planetary gear set 1330.

The planetary gear set 1340 also has an outer ring gear member 1344 that circumscribes an inner sun gear member 1342. A plurality of planet gears 1347 are also rotatably mounted in a carrier 1346 such that each planet gear member 1347 simultaneously, and meshingly, engages both the outer ring gear member 1344 and the inner sun gear member 1342 of the planetary gear set 1340.

The transmission input member 17 is continuously connected with the ring gear 1324, and the transmission output member 19 is continuously connected with the carrier 1346. A first interconnecting member 1370 continuously connects the sun gear 1322 with the ring gear 1334. A second interconnecting member 1372 continuously connects the carrier 1326 with the carrier 1336. A third interconnecting member 1374 continuously connects the sun gear 1332 with the sun gear 1342.

The transmission 1314 also incorporates first and second motor/generators 1380 and 1382, respectively. The stator of the first motor/generator 1380 is secured to the transmission housing 1360. The rotor of the first motor/generator 1380 is secured to the sun gear 1322.

The stator of the second motor/generator 1382 is also secured to the transmission housing 1360. The rotor of the second motor/generator 1382 is secured to the third interconnecting member 1374.

A first torque-transfer device, such as a clutch 1350, selectively connects the carrier 1326 with the ring gear 1324. A second torque-transfer device such as clutch 1352 selectively connects the ring gear 1334 with the ring gear 1344. A third torque-transfer device, such as brake 1354, selectively connects the ring gear 1344 with the transmission housing 1360. The first, second and third torque-transfer devices 1350, 1352 and 1354 are employed to assist in the selection of the operational modes of the transmission 1314.

The hybrid transmission 1314 receives power from the engine 12, and also exchanges power with an electric power source 1386, which is operatively connected to a controller 1388.

The operating mode table of FIG. 14b illustrates the clutching engagements, motor/generator conditions and output/input ratios for the five operating modes of the transmission 1314. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3, F4) as described previously.

As set forth above, the engagement schedule for the torque-transfer devices is shown in the operating mode table and fixed ratio mode table of FIG. 14b. FIG. 14b also provides an example of torque ratios that are available utilizing the ring gear/sun gear tooth ratios given by way of example in FIG. 14b. The $N_{R1}/N_{S1}$ value is the tooth ratio of the planetary gear set 1320; the $N_{R2}/N_{S2}$ value is the tooth ratio of the planetary gear set 1330; and the $N_{R3}/N_{S3}$ value is the tooth ratio of the planetary gear set 1340. Also, the chart of FIG. 14b describes the ratio steps that are attained utilizing the sample of tooth ratios given. For example, the ratio step between first and second fixed forward torque ratios is 1.63, the ratio step between the second and third fixed forward torque ratios is 2.00, and the ratio step between the third and fourth fixed forward torque ratios is 1.79.

Description of a Fifteenth Exemplary Embodiment

Figures 15A, 15B:
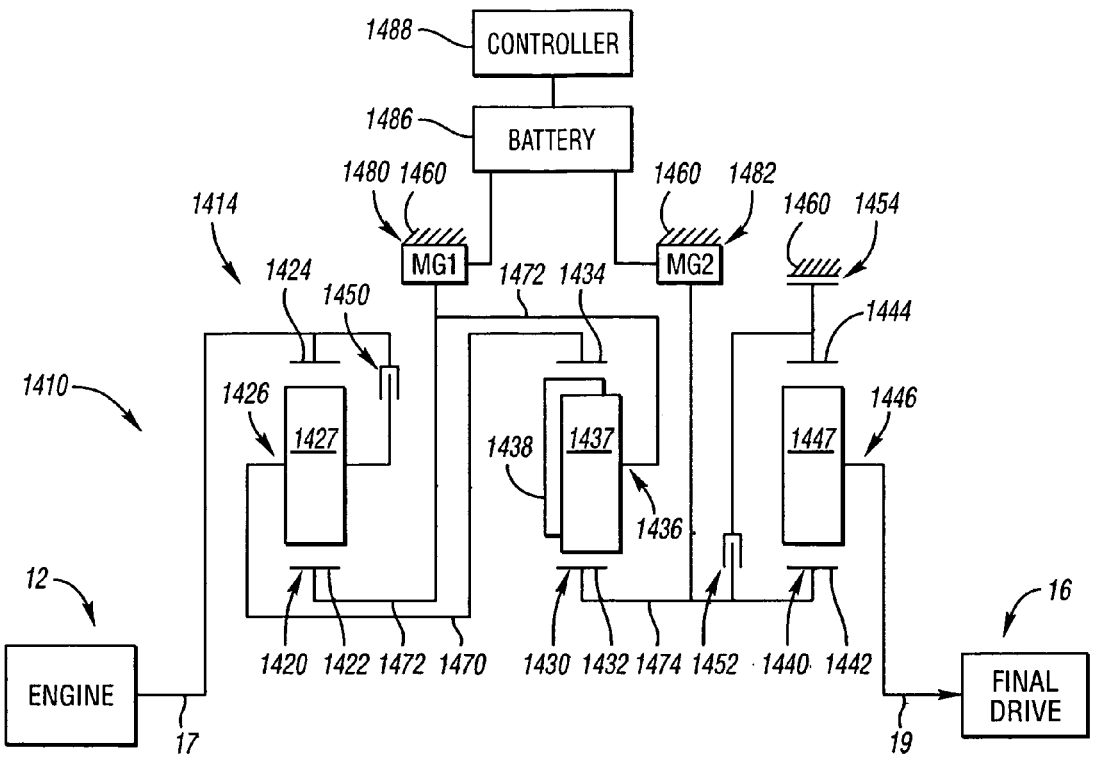

With reference to FIG. 15a, a powertrain 1410 is shown, including an engine 12 connected to one preferred embodiment of the improved electrically variable transmission, designated generally by the numeral 1414. The transmission 1414 is designed to receive at least a portion of its driving power from the engine 12.

As shown, the engine 12 has an output shaft that serves as the input member 17 of the transmission 1414. A transient torque damper (not shown) may also be implemented between the engine 12 and the input member 17 of the transmission.

Irrespective of the means by which the engine 12 is connected to the transmission input member 17, the transmission input member 17 is operatively connected to a planetary gear set in the transmission 1414. An output member 19 of the transmission 1414 is connected to a final drive 16.

The transmission 1414 utilizes three planetary gear sets 1420, 1430 and 1440. The planetary gear set 1420 employs an outer ring gear member 1424 which circumscribes an inner sun gear member 1422. A carrier 1426 rotatably supports a plurality of planet gears 1427 such that each planet gear 1427 meshingly engages both the outer ring gear member 1424 and the inner sun gear member 1422 of the first planetary gear set 1420.

The planetary gear set 1430 also has an outer ring gear member 1434 that circumscribes an inner sun gear member 1432. A plurality of planet gears 1437, 1438 are also rotatably mounted in a carrier 1436 such that each planet gear member 1438 meshingly engages the outer, ring gear member 1434 and planet gears 1437 meshingly engage the inner, sun gear member 1432 of the planetary gear set 1430.

The planetary gear set 1440 also has an outer ring gear member 1444 that circumscribes an inner sun gear member 1442. A plurality of planet gears 1447 are also rotatably mounted in a carrier 1446 such that each planet gear member 1447 simultaneously, and meshingly, engages both the outer ring gear member 1444 and the inner sun gear member 1442 of the planetary gear set 1440.

The transmission input member 17 is continuously connected with the ring gear 1424, and the transmission output member 19 is continuously connected with the carrier 1446. A first interconnecting member 1470 continuously connects the carrier 1426 with the ring gear 1434. A second interconnecting member 1472 continuously connects the sun gear 1422 with the carrier 1436. A third interconnecting member 1474 continuously connects the sun gear 1432 with the sun gear 1442.

The transmission 1414 also incorporates first and second motor/generators 1480 and 1482, respectively. The stator of the first motor/generator 1480 is secured to the transmission housing 1460. The rotor of the first motor/generator 1480 is secured to the sun gear 1422. The stator of the second motor/generator 1482 is also secured to the transmission housing 1460. The rotor of the second motor/generator 1482 is secured to the third interconnecting member 1474.

A first torque-transfer device, such as a clutch 1450, selectively connects the ring gear 1424 with the carrier 1426. A second torque-transfer device, such as a clutch 1452, selectively connects the ring gear 1444 with the sun gear 1442. A third torque-transfer device, such as a brake 1454, selectively connects the ring gear 1444 with the transmission housing 1460. The first, second and third torque-transfer devices 1450, 1452 and 1454 are employed to assist in the selection of the operational modes of the transmission 1414.

The hybrid transmission 1414 receives power from the engine 12, and also exchanges power with an electric power source 1486, which is operably connected to a controller 1488.

The operating mode table of FIG. 15b illustrates the clutching engagements, motor/generator conditions and output/input ratios for the five operating modes of the transmission 1414. These modes include the "battery reverse mode" (Batt Rev), the "EVT reverse mode" (EVT Rev), "reverse and forward launch modes" (TC Rev and TC For), "continuously variable transmission range modes" (Range 1.1, 1.2, 1.3 . . . ) and "fixed ratio modes" (F1, F2, F3, F4) as described previously.

As set forth above, the engagement schedule for the torque-transfer devices is shown in the operating mode table and fixed ratio mode table of FIG. 15b. FIG. 15b also provides an example of torque ratios that are available utilizing the ring gear/sun gear tooth ratios given by way of example in FIG. 15b. The $N_{R1}/N_{S1}$ value is the tooth ratio of the planetary gear set 1420; the $N_{R2}/N_{S2}$ value is the tooth ratio of the planetary gear set 1430; and the $N_{R3}/N_{S3}$ value is the tooth ratio of the planetary gear set 1440. Also, the chart of FIG. 15b describes the ratio steps that are attained utilizing the sample of tooth ratios given. For example, the step ratio between first and second fixed forward torque ratios is 1.63, the step ratio between the second and third fixed forward torque ratios is 2.00, and the step ratio between the third and fourth fixed forward torque ratios is 1.64.

In the claims, the language "continuously connected" or "continuously connecting" refers to a direct connection or a proportionally geared connection, such as gearing to an offset axis.

While various preferred embodiments of the present invention are disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

The invention claimed is:

1. An electrically variable transmission comprising:
    an input member to receive power from an engine;
    an output member;
    first and second motor/generators;
    first, second and third differential gear sets each having first, second and third members;
    said input member being continuously connected with at least one member of said gear sets, and said output member being continuously connected with another member of said gear sets;
    a first interconnecting member continuously connecting said first member of said first gear set with said first member of said second gear set;
    a second interconnecting member continuously connecting said second member of said first gear set with said second member of said second gear set;
    a third interconnecting member continuously connecting said third member of said second gear set with said first member of said third gear set;
    said first motor/generator being continuously connected with said first or second interconnecting member, or with a member of said first gear set;
    said second motor/generator being continuously connected with said first, second or third interconnecting member, or with a member of said third gear set;
    a first torque transfer device selectively connecting a member of said first gear set with another member of said first, second, or third gear set;
    a second torque transfer device selectively connecting a member of said third gear set with another member of said first, second or third gear set, the pair of members connected by said second torque transfer device being different from the pair of members connected by said first torque transfer device; and
    a third torque transfer device selectively grounding a member of said third gear set;
    wherein said first, second and third torque transfer devices are engageable alone or in pairs to provide an electrically variable transmission with a continuously variable range of speed ratios and four fixed forward speed ratios.

2. The electrically variable transmission of claim 1, wherein said first, second and third differential gear sets are planetary gear sets.

3. The electrically variable transmission of claim 2, wherein carriers of each of said planetary gear sets are single-pinion carriers.

4. The electrically variable transmission of claim 2, wherein at least one carrier of said planetary gear sets is a double-pinion carrier.

5. The electrically variable transmission of claim 1, further comprising a fourth torque transfer device connected in parallel with for selectively braking rotation of one said first and second motor/generators for use in establishing said fixed ratios.

6. The electrically variable transmission of claim 1, further comprising fourth and fifth torque transfer devices connected in parallel with for selectively braking rotation of said first and second motor/generators, respectively, for selectively preventing rotation of said first and second motor/generators for use in establishing said fixed ratios.

7. The electrically variable transmission of claim 1, wherein said first, second and third torque transfer devices and said first and second motor/generators are operable to provide five operating modes in the electrically variable transmission, including battery reverse mode, EVT reverse mode, reverse and forward launch modes, continuously variable transmission range mode, and fixed ratio mode.

8. An electrically variable transmission comprising:
an input member to receive power from an engine;
an output member;
first and second motor/generators;
first, second and third differential gear sets each having first, second and third members;
said input member being continuously connected with at least one member of said gear sets, and said output member being continuously connected with another member of said gear sets;
a first interconnecting member continuously connecting said first member of said first gear set with said first member of said second gear set;
a second interconnecting member continuously connecting said second member of said first gear set with said second member of said second gear set;
a third interconnecting member continuously connecting said third member of said second gear set with said first member of said third gear set;
said first motor/generator being continuously connected with said first or second interconnecting member, or with a member of said first gear set;
said second motor/generator being continuously connected with said first, second or third interconnecting member, or with a member of said third gear set; and
first, second and third torque transfer devices for selectively interconnecting said members of said first, second or third gear sets with said first, second or third interconnecting member, said stationary member or with other members of said planetary gear sets, said first, second and third torque transfer devices being engageable alone or in pairs to provide an electrically variable transmission with a continuously variable range of speed ratios and four fixed forward speed ratios between said input member and said output member.

9. The electrically variable transmission of claim 8, wherein said first, second and third differential gear sets are planetary gear sets, and said first torque transfer device selectively connects a member of said first planetary gear set with another member of said first, second, or third planetary gear set.

10. The electrically variable transmission of claim 9, wherein said second torque transfer device selectively connects a member of said third planetary gear set with another member of said first, second or third planetary gear set, the pair of members connected by said second torque transfer device being different from the pair of members connected by said first torque transfer device.

11. The electrically variable transmission of claim 10, wherein said third torque transfer device selectively connects a member of said third planetary gear set with said stationary member.

12. The electrically variable transmission of claim 11, wherein carriers of each of said planetary gear sets are single-pinion carriers.

13. The electrically variable transmission of claim 11, wherein at least one carrier of said planetary gear sets is a double-pinion carrier.

14. The electrically variable transmission of claim 11, further comprising a fourth torque transfer device connected in parallel with for selectively braking rotation of one of said first and second motor/generators for use in establishing said fixed ratios.

15. The electrically variable transmission of claim 11, further comprising fourth and fifth torque transfer devices connected in parallel with selectively braking rotation of said first and second motor/generators, respectively, for selectively preventing rotation of said first and second motor/generators for use in establishing said fixed ratios.

16. An electrically variable transmission comprising:
an input member to receive power from an engine;
an output member;
first and second motor/generators, each having a selectively engageable motor brake connected in parallel with the respective motor/generator;
first, second and third differential gear sets each having first, second and third members;
said input member being continuously connected with at least one member of said gear sets, and said output member being continuously connected with another member of said gear sets;
a first interconnecting member continuously connecting said first member of said first gear set with said first member of said second gear set;
a second interconnecting member continuously connecting said second member of said first gear set with said second member of said second gear set;
a third interconnecting member continuously connecting said third member of said second gear set with said first member of said third gear set;
said first motor/generator being continuously connected with said first or second interconnecting member, or with a member of said first gear set;
said second motor/generator being continuously connected with said first, second or third interconnecting member, or with a member of said third gear set; and
first, second and third torque transfer devices for selectively interconnecting said members of said first, second or third gear sets with said first, second or third interconnecting member, said stationary member or with other members of said planetary gear sets;
wherein said first, second and third torque transfer devices and motor brakes are engageable singly or in combinations of two to provide an electrically variable transmission with a continuously variable range of speed ratios and four fixed forward speed ratios between said input member and said output member.

* * * * *